(12) United States Patent
Kleinerman et al.

(10) Patent No.: US 11,856,254 B2
(45) Date of Patent: *Dec. 26, 2023

(54) DYNAMICALLY ADJUSTABLE ELECTRONIC PROGRAM GUIDE

(71) Applicant: Google LLC, Mountain View, CA (US)

(72) Inventors: Michael Kleinerman, New York, NY (US); Neil Cormican, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,428

(22) Filed: Oct. 24, 2022

(65) Prior Publication Data

US 2023/0113931 A1 Apr. 13, 2023

Related U.S. Application Data

(63) Continuation of application No. 16/788,141, filed on Feb. 11, 2020, now Pat. No. 11,483,613, which is a
(Continued)

(51) Int. Cl.
*H04N 21/431* (2011.01)
*H04N 21/262* (2011.01)
(Continued)

(52) U.S. Cl.
CPC ... *H04N 21/4312* (2013.01); *H04N 21/26283* (2013.01); *H04N 21/41407* (2013.01);
(Continued)

(58) Field of Classification Search
CPC ......... H04N 21/4312; H04N 21/26283; H04N 21/41407; H04N 21/4314; H04N 21/47;
(Continued)

(56) References Cited

U.S. PATENT DOCUMENTS 6,392,709 B1 5/2002 Orito
6,526,577 B1 2/2003 Knudson
(Continued)

FOREIGN PATENT DOCUMENTS

CN 101480045 A 7/2009
JP 2011009954 A 1/2011

OTHER PUBLICATIONS

PCT Application PCT/US2018/025512, International Search Report and Written Opinion dated Jun. 28, 2018, 17 pages.
(Continued)

*Primary Examiner* — Kunal Langhnoja
(74) *Attorney, Agent, or Firm* — Lowenstein Sandler LLP

(57) ABSTRACT

Metadata for media content items is received. The media content items are displayed in an overview area in an electronic program guide (EPG) of a user interface. The overview area includes cells aligned in one or more rows. Input of a selection of one of the media content items displayed at the EPG in the user interface is received. Responsive to receiving the input of the selected media content item, the selected media content item is displayed in a focus area in the EPG of the user interface. The focus area includes expanded metadata that includes a sample of the selected media content item that is played as an underlay of a display of at least some of the subset of the metadata of the selected media content item.

20 Claims, 11 Drawing Sheets

Related U.S. Application Data continuation of application No. 15/627,345, filed on Jun. 19, 2017, now Pat. No. 10,567,829.

(51) Int. Cl.
  *H04N 21/482* (2011.01)
  *H04N 21/414* (2011.01)
  *H04N 21/485* (2011.01)
  *H04N 21/47* (2011.01)
  *H04L 65/75* (2022.01)

(52) U.S. Cl.
  CPC ......... *H04N 21/4314* (2013.01); *H04N 21/47* (2013.01); *H04N 21/4821* (2013.01); *H04N 21/4858* (2013.01); *H04L 65/75* (2022.05)

(58) Field of Classification Search
  CPC . H04N 21/4821; H04N 21/4858; H04L 65/75
  See application file for complete search history.

(56) References Cited

U.S. PATENT DOCUMENTS

| | | |
|---|---|---|
| 10,567,829 B2 | 2/2020 | Kleinerman |
| 2004/0237105 A1 | 11/2004 | Ha |
| 2005/0015804 A1 | 1/2005 | Lajoie |
| 2005/0235321 A1 | 10/2005 | Ahmad-Taylor |
| 2006/0282852 A1 | 12/2006 | Purpura |
| 2007/0011702 A1 | 1/2007 | Vaysman |
| 2007/0300256 A1 | 12/2007 | Coomer |
| 2008/0046932 A1* | 2/2008 | Stallings ............ H04N 21/4821 725/39 |
| 2008/0127265 A1 | 5/2008 | Ward |
| 2009/0133066 A1 | 5/2009 | Choi |
| 2012/0159544 A1 | 6/2012 | Longet |
| 2013/0014014 A1 | 1/2013 | Edwards |
| 2013/0055311 A1* | 2/2013 | Kirby ................ H04N 21/6543 725/44 |
| 2015/0020111 A1 | 1/2015 | Stallings |
| 2016/0112752 A1 | 4/2016 | Selvaraj |
| 2017/0142467 A1 | 5/2017 | Nishimura |
| 2018/0199110 A1 | 7/2018 | Cormican |

OTHER PUBLICATIONS

PCT Application PCT/US2018/025512, 2nd Written Opinion of IPEA dated Jan. 28, 2019, 11 pages.

* cited by examiner

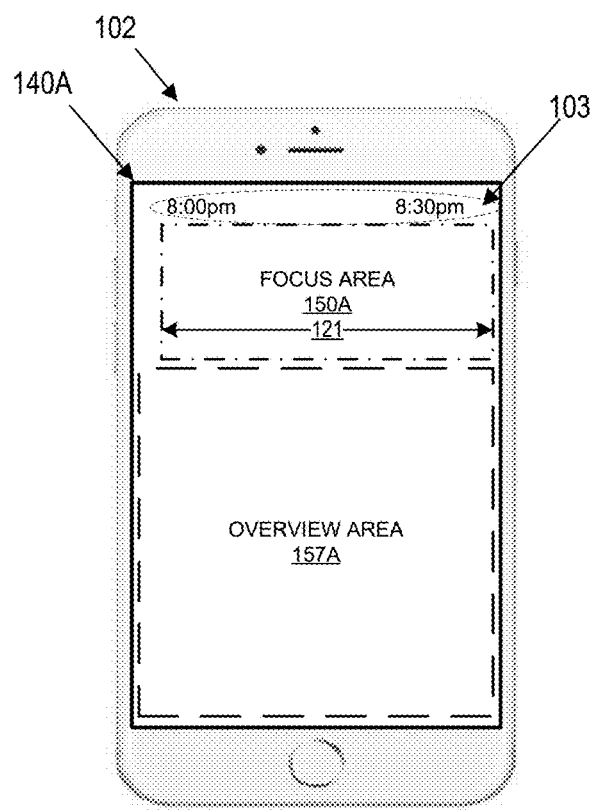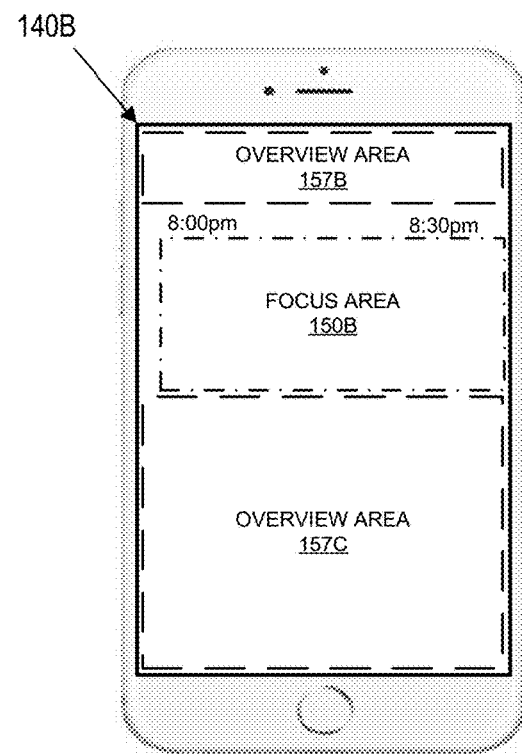
FIG. 1A  FIG. 1B
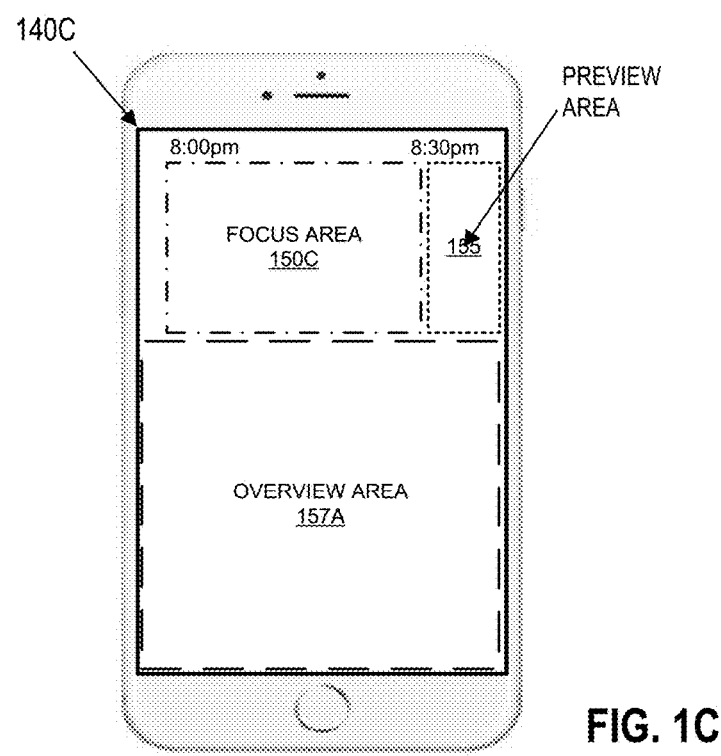
FIG. 1C

DYNAMICALLY ADJUSTABLE ELECTRONIC PROGRAM GUIDE

RELATED APPLICATION

This application is a continuation of U.S. patent application Ser. No. 16/788,141, filed Feb. 11, 2020, which is a continuation of U.S. patent application Ser. No. 15/627,345, filed on Jun. 19, 2017, now issued as U.S. Pat. No. 10,567,829, issued on Feb. 18, 2020, the entire contents of all are hereby incorporated by reference herein.

TECHNICAL FIELD

Aspects and implementations of the present disclosure relate to electronic program guides (EPGs), and more specifically, to a dynamically adjustable EPG.

BACKGROUND

EPGs may include a schedule for playing media content items (e.g., videos). The EPG can include information, such as the titles and scheduled times, for the videos that are to be played. When the EPG is displayed on a user device (e.g., mobile phone), which may have a small display, the information for the videos in the EPG may be truncated or unreadable due to the small screen size.

SUMMARY

Aspects and implementations of the present disclosure improve electronic program guide (EPG) technology by dynamically adjusting an EPG in a user interface (UI) on a mobile computing device to display additional information for a particular video. The technology can dynamically and automatically modify the amount of information and type of information being displayed for the videos in an EPG. In one implementation, the dynamic adjustment of the EPG can be made automatically in response to a single user interaction with the EPG. The EPG can include a focus area that automatically displays additional information for a particular video.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1A illustrates an example of a focus area and overview area in a dynamically adjustable electronic program guide (EPG) on a mobile computing device, in accordance with one implementation of the disclosure.

FIG. 1B illustrates an example of a dynamically adjustable EPG having multiple overview areas, in accordance with one implementation of the disclosure.

FIG. 1C illustrates an example of a dynamically adjustable EPG having a preview area, in accordance with one implementation of the disclosure.

DETAILED DESCRIPTION

Figure 2:
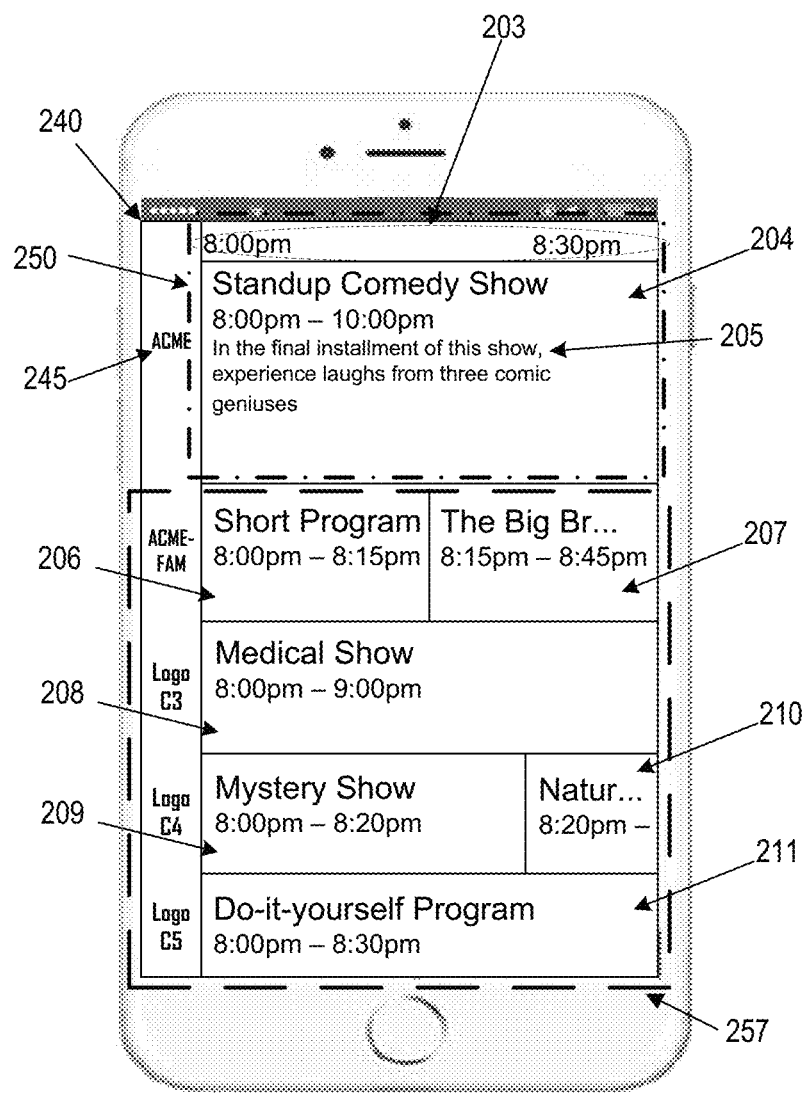
FIG. 2 illustrates an example of metadata displayed in a dynamically adjustable EPG, in accordance with one implementation of the disclosure.

Aspects and implementations of the present disclosure are directed to dynamically adjusting an electronic program guide (EPG) in a user interface (UI) on a mobile computing device to display additional information for a particular video. A video streaming service can be an on demand online source for videos, TV shows, movies and other streaming media. A video is used as one example of streaming media throughout this document. The technology of the present disclosure can dynamically and automatically modify the amount of information and type of information being displayed for the videos in an EPG. For example, the EPG may include a schedule for playing videos and information for each of the videos. With traditional EPGs, the type of information that is being displayed for each of the videos is typically the same. For example, the EPG can include a title for each video and the scheduled times for playing each video. When the EPG is displayed on mobile computing devices that have small display screens, the information for each of the videos is generally displayed using a small font size and/or a limited amount of video information is displayed. Users generally have to manually zoom into the user interface to read the information and zoom back out of the user interface to display more of the EPG. Because of the smaller display, the information may also be limited and/or truncated. For example, if a title of a video is too long for the EPG on a small display, the EPG may include a truncated title for the video or an incomplete title for the video. Users may have to trigger another user interface window (e.g., pop-up window) to display a complete title for the video, and may have to close the pop-up window to return to the display of the EPG. Traditional EPGs process a high number of user interface commands for the high number of user interactions.

Aspects of the present disclosure improve electronic programming guide technology by dynamically adjusting the types and/or amount of video information that are being displayed in the EPG. Additionally, the cells including the video information may also be dynamically adjusted to reveal additional information included in the cells. In one implementation, the dynamic adjustment of the EPG can be made automatically in response to a single user interaction with the EPG. The EPG can include a focus area that automatically displays additional information for a particular video. Accordingly, described herein in various implementations are technologies that provide a greater amount of information for a video on the display of a mobile device while processing a reduced number of user interface interactions. For example, a user does not need to initiate multiple operations that generate a pop-up window and/or close the pop-up window to access the additional video information.

FIG. 1A illustrates an example of a focus area and overview area in a dynamically adjustable EPG 140A on a mobile computing device 102, in accordance with one implementation of the disclosure. The EPG 140A can be displayed in a user interface. The user interface can be a graphical user interface. The EPG 140A can include a focus area 150A that automatically displays additional information for a particular media content item (e.g., video) that is selected by a user, as described in greater detail below in conjunction with FIGS. 2-3. Media content items, can include, and are not limited to, digital videos, digital movies, digital photos, digital music, website content, social media updates, etc. A video is used as one example of a media content item throughout this document.

The EPG 140A can include an overview area 157A that displays limited information about other media content items (e.g., videos) that are scheduled to be played, as described in greater detail below in conjunction with FIGS. 2-3. The focus area 150A can be in a top portion, middle portion, or bottom portion of the EPG 140A. The content in the focus area 150A and overview area 157A can be scrollable.

The focus area 150A can have a width 121. Configuration data can include a maximum width parameter and a minimum width parameter for the focus area 150A. The width 121 of the focus area 150A can be dynamically adjusted to correspond to (e.g., match, or not be greater or smaller than) either the maximum width or the minimum width that is specified in the configuration data, as described in greater detail below in conjunction with FIG. 3.

The focus area 150A can be associated with a time interval and can display a timeline 103 based on the time interval. An interval is a distinct measure of time defined by a beginning time and an end time. For example, the focus area 150A can be assigned a 30-minute time interval, and the timeline 103 can have a beginning time of 8:00 pm and an end time of 8:30 pm. In one implementation, the beginning time (e.g., 8:00 pm) for the timeline 103 corresponds to a scheduled start time for a video that is selected for the focus area 150A. In another implementation, the beginning time (e.g., 8:00 pm) for the timeline 103 is a current time.

The time interval and the display of the timeline 103 can be dynamically adjusted, as described in greater detail below in conjunction with FIG. 3. The focus area 150A can have a maximum time interval. In one implementation, the maximum time interval is 30 minutes. The maximum time interval can set a limit for the period of time represented by the timeline 103. For example, the timeline 103 may not be extended beyond a 30-minute time interval. The parameters (e.g., width, maximum time interval) of the focus area 150A can be defined by configuration data, as described in greater detail below in conjunction with FIG. 4.

The EPG 140A can be presented in a layout that corresponds with an orientation of mobile device 102. For example, when the mobile device 102 has landscape (horizontal) orientation, the EPG 140A can have a landscape layout, and when the mobile device 102 has portrait (vertical) orientation, the EPG 140A can have a portrait layout.

FIG. 1B illustrates an example of a dynamically adjustable EPG 140B having multiple overview areas 157B, 157C, in accordance with one implementation of the disclosure. The focus area 150B can display additional information for a particular video. The multiple overview areas 157B, 157C can each display limited information about other videos that are scheduled to be streamed and played. In one implementation the focus area 150B is in between the multiple overview areas (e.g., overview area 157B and overview area 157C). The content in the focus area 150B and overview areas 157B, 157C can be scrollable.

FIG. 1C illustrates an example of a dynamically adjustable EPG 140C having a preview area, in accordance with one implementation of the disclosure. The EPG 140C includes a focus area 150C, an overview area 157A, and a preview area 155. The content in the focus area 150C, overview area 157A, and preview area 155 can be scrollable. The preview area 155 displays additional information about an upcoming scheduled video to be played after the selected video that is being displayed in the focus area 150C. In one implementation, the preview area 155 is adjacent to the focus area 150C along a horizontal axis. In one implementation, the preview area 155 is the same height as the focus area 150C. The width of the preview area is described in greater detail below in conjunction with FIG. 6. In one implementation, the preview area 155 and the focus area 150C display information for videos that are to be streamed via the same channel. Channels are described in greater detail below in conjunction with FIG. 2.

FIG. 2 illustrates an example of metadata displayed in a dynamically adjustable EPG 240, in accordance with one implementation of the disclosure. The EPG 240 can include information for a schedule for streaming media content items (e.g., videos). In one implementation, the schedule is pre-defined. In another implementation, the schedule is dynamically defined in real-time. In yet another implementation, a portion of the schedule is pre-defined and another portion is dynamically defined in real-time. As used herein, the term real-time is used to indicate events that occur proximate in time to their cause, e.g., without unnecessary delay. For example, real-time scheduling of one or more videos involves determining a video has finished playing, and making a selection or determination, in real-time (e.g., within a predefined time limit, such as 0.1 second or second, of the video finishing), of the video(s) to be played next based on an analysis of a set of videos that are associated with a user (e.g., played by a user, liked by a user, shared by a user, etc.). In one implementation, the selection of which videos are to be streamed and played is based on videos that a user has watched, liked, shared, added to a playlist, commented on, subscribed to (as part of a channel subscription or individually), etc.

The EPG 240 can include visual representations of the scheduled videos. In one implementation, the visual representations are cells (e.g., cell 204, cell 206, cell 207, cell 208, cell 209, cell 210, and cell 211). The cells can be in a focus area 250 or in an overview area 257. For example, focus area 250 includes cell 204, and overview area 257 includes cells 206, 207, 208, 209, 210, 211.

The cells can display schedule time data (e.g., start time, end time) for a corresponding scheduled video. The cells can display a video identifier (e.g., video title) for a corresponding scheduled video. The cell(s) in the focus area 250 can include expanded information compared to the information in the cells in the overview area 257. Expanded information can refer to information that is complete and/or in addition to the information displayed in the overview area 257. For example, cell 204 in the focus area 250 includes a complete title "Standup Comedy Show," a complete display of a scheduled start time and a schedule end time, and a description 205 of the content of the video "Standup Comedy Show".

Due to the width of the overview area 257 and the widths of the individual cells in the overview area 257, some of the cells in the overview area 257 include incomplete titles, and/or truncated titles. For example, cell 207 in the overview area 257 can represent a video that has a complete title "The Big Brown Fox," and the title that is displayed in cell 207 can be the incomplete title "The Big Br . . . ". In another example, in the overview area 257, cell 210 can represent a video having a complete title "Nature Show," and the title that is displayed in cell 210 can be the incomplete title "Natur . . . ".

One or more of the scheduled videos can be associated with a content provider. A video streaming service provider can assign channels to content providers, and content providers can stream videos according to the schedule via a respective channel. A channel can be data content available from a common source or data content having a common topic or theme. The data content can be digital content chosen by a user, digital content made available by a user, digital content uploaded by a user, digital content chosen by a content provider, digital content chosen by a broadcaster, etc. The EPG 240 can include channel identifiers. The channel identifiers can be images and/or text. The images can be logos of a content provider that is assigned to the respective channel. For example, the channel identifier 245 can be a logo image for ACME network. In one implementation, the EPG 240 includes a channel identifier for the video content being displayed in the focus area 250. The channel identifier for the focus area 250 can be adjacent to the focus area 250.

The EPG 240 can include a channel axis having channel identifiers along the axis. In one implementation, the channel axis is a vertical axis. The cells for the videos in the EPG 240 can be arranged by content provider and/or channel. For example, cell 206 for the video "Short Program" and cell 207 for the video "The Big Br . . . " are aligned horizontally with the ACME-FAM channel.

The EPG 240 can include a time axis. In one implementation, the time axis is a horizontal axis. The video representations (e.g., cells) can be positioned in the EPG 240 based on time and can correspond to the timeline 203 of the focus area 250. For example, the video "Short Program" may be scheduled to play at 8:00 pm on the ACME-FAM channel and the left side of cell 206 for video "Short Program" is aligned with "8:00 pm" in the timeline 203. In another example, the video "The Big Br . . . " may be scheduled to play at 8:15 pm on the ACME-FAM channel and the left side of cell 207 for the video "The Big Br . . . " is aligned in between "8:00 pm" and "8:30 pm" in the timeline 203. It should be understood that the current time is 8:00 pm for explanatory purposes regarding the schedule of videos in each of the EPGs discussed in this document.

As depicted, due to the small screen size of a display, the overview area 257 includes cells (e.g., cells 206, 207, 208, 209, 210, 211) that display limited metadata relative to the expanded metadata being displayed for a video in the focus area 250. The various types of metadata are described in greater detail below in conjunction with FIG. 4. A subset of metadata is a limited set of metadata, which refers to incomplete metadata (e.g., incomplete title, incomplete start time, incomplete end time), truncated metadata, and a number of types of metadata less than the number of types of metadata in the focus area 250. Expanded metadata can include metadata that is complete (e.g., complete title) and additional types of metadata (e.g., description, statistics, ratings, thumbnail) that are not being displayed in the overview area 257.

Figure 3:
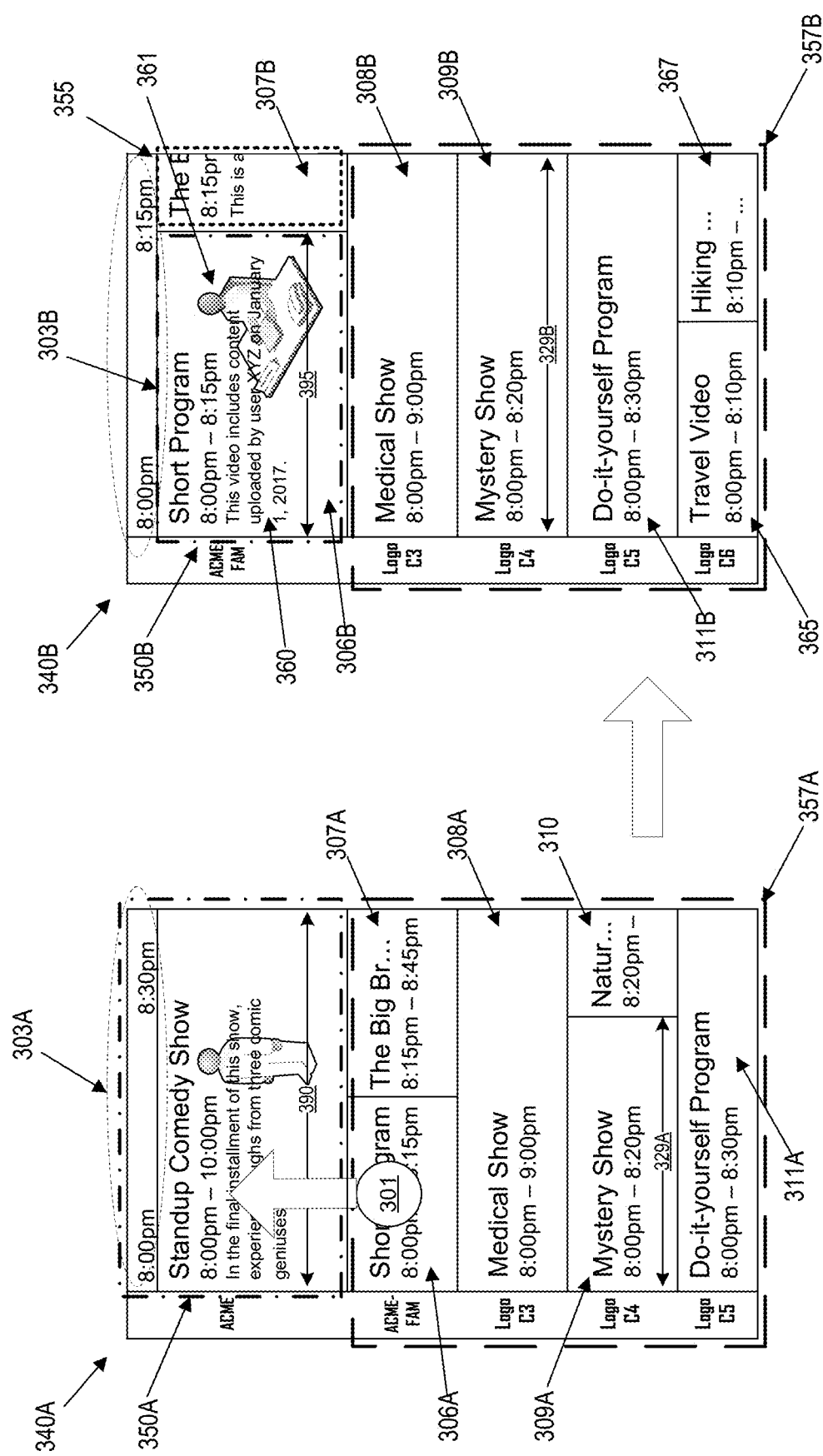
FIG. 3 depicts an example of selecting a media content item in an overview area in an EPG for a focus area in the EPG and dynamically adjusting a timeline of the focus area based on the selected media content item, in accordance with one implementation of the present disclosure.

FIG. 3 depicts an example of selecting a media content item in an overview area in an EPG for a focus area in the EPG and dynamically adjusting a timeline of the focus area based on the selected media content item, in accordance with one implementation of the present disclosure. EPG 340A depicts a cell in the focus area 350A and cells in the overview area 357A as a user selects a video from the overview area 357A for the focus area 350A. For example, a user can select (e.g., tap) location 301 and swipe in a vertical direction (e.g., bottom-to-top) to scroll the cells in the overview area 357A upward towards the focus area 350A. In one implementation, the swipe gesture is interpreted as a selection of the video (e.g., "Short Program") that is being represented by the top most cell (e.g., cell 306A) in the overview area 357A that is scheduled next for streaming. In another implementation, the input for the selection may be a user selecting a cell (e.g., cell 306A via location 301), dragging the selected cell (e.g., cell 306A) to the focus area 350A, and releasing the dragged cell. In the overview area 357A in EPG 340A, the cell 306A for the selected "Short Program" video includes a limited set of metadata for the selected video. For example, cell 306A includes a title and a scheduled duration.

In response to the selection of the video, the cell 306A for the selected video is automatically moved to the focus area 350A. EPG 340B is a dynamically adjusted version of EPG 340A and depicts the cell 306B in the focus area 350B and cells in overview area 357B after cell 306A has moved to the focus area 350A.

There may be one or more conditions pertaining to the maximum time interval of the focus area. The one or more conditions may pertain to whether the scheduled duration for streaming the selected video is less than the maximum time interval, equal to the maximum time interval, and/or greater than the maximum time interval. In an example, the condition may pertain to whether the scheduled duration for streaming the selected video is greater than the maximum time, and it may be determined that the scheduled duration for streaming the selected video does not satisfy the condition when the scheduled duration is less or equal to than the maximum time interval for the focus area. In another example, a condition may pertain to whether the scheduled duration for streaming the selected video is greater or equal to than the maximum time interval of the focus area, and it may be determined that the scheduled duration for streaming the selected video does not satisfy the condition when the scheduled duration is less than the maximum time interval. Satisfaction or dissatisfaction of the one or more conditions may cause the timeline and/or the width of the focus area to be adjusted, as described in more detail below.

The timeline 303A (e.g., "8:00 pm-8:30 pm") in focus area 350A is changed to timeline 303B for focus area 350B.

The adjustment of timeline 303A to create timeline 303B can be based on the duration of the selected video "Short Program." If the scheduled duration for streaming the selected video (e.g., "Short Program") does not satisfy a condition pertaining to the maximum time interval of the focus area 350B (e.g., the scheduled duration for streaming the selected video is less or equal to than the maximum time interval of the focus area 350B), the time interval for timeline 303B of focus area 350B is created to match the scheduled duration for the selected video. The beginning time and end time for timeline 303B can match the scheduled start time and scheduled end time for the selected video. For example, the scheduled duration (e.g., 8:00 pm-8:15 pm) for streaming the selected video "Short Program" is less than a maximum time interval (e.g., 30-minutes) of the focus area 350B, and the "8:00 pm-8:30 pm" timeline 303A in EPG 340A changes to "8:00 pm-8:15 pm" in timeline 303B in dynamically adjusted EPG 340B. If the scheduled duration for streaming the selected video satisfies a condition pertaining to the maximum time interval of the focus area 350B (e.g., the scheduled duration for streaming the selected video is greater than the maximum time interval of the focus area 350B), the time interval for timeline 303B of focus area 350B is created to match the maximum time interval.

The subset of metadata (e.g., title, duration) in the cell 306A in the focus area 350B is replaced with expanded metadata for the selected "Short Program" video, as depicted in cell 306B in focus area 350B. For example, the title and duration in cell 306A is replaced with a title, duration, description 360 ("This video includes content uploaded by user XYZ on Jan. 1, 2017."), and sample 361, as depicted in cell 306B in focus area 350B. The sample 361 can be an image (e.g., thumbnail) or a rendering of a short segment of the video. In some implementations, the expanded metadata may be included in the cell 306A but may be obstructed and/or truncated due to the reduced size of the cell 306A, and dynamically expanded cell 306B in the focus area 350B may display the expanded metadata. If the selected video is currently streaming, then the portion of the selected video that is currently streaming can be played as the sample in the focus area 350B. The sample can be played as an underlay of a display of the expanded metadata of the selected video. If the selected video is not currently streaming, an image of a frame of the selected video can be displayed in the focus area 350B as an underlay of a display of the expanded metadata of the selected video in the focus area 350B.

The height of the cell 306A that has been moved to the focus area 350B can be adjusted to a default height associated with the focus area 350B. The width of the cell 306A that has been moved to the focus area 350B can be adjusted based on the maximum time interval (e.g., 30-minutes) of the focus area 350B. Width 390 in focus area 350A depicts a maximum width, and width 395 in focus area 350B depicts a minimum width. The maximum width of a focus area and minimum width of a focus area can be specified in configuration data.

If the scheduled duration for streaming the selected video does not satisfy a condition pertaining to the maximum time interval of the focus area (e.g., the scheduled duration for streaming the selected video is less than the maximum time interval of the focus area), the width of the cell for the selected video in the focus area is set to a minimum width 395. If the scheduled duration for streaming the selected video satisfies a condition pertaining to the maximum time interval of the focus area (e.g., the scheduled duration for streaming the selected video is greater than or equal to the maximum time interval of the focus area), the width of the cell for the selected video in the focus area is set to a maximum width 390. In this example, the scheduled duration (e.g., 8:00 pm-8:15 pm) for streaming the selected video "Short Program" is less than the maximum time interval (e.g., 30-mintues) of the focus area 350B, and the width of cell 306B for the selected "Short Program" video in the focus area 350B is set to the minimum width 395.

The widths of other cells in the overview area 357B can be adjusted based on the adjusted timeline 303B (e.g., "8:00 pm-8:15 pm") of the focus area 350B. For example, in EPG 340A, cell 309A for video "Mystery Show" has a width 329, which is scaled to the 30-minute time interval in timeline 303A (e.g., "8:00 pm-8:30 pm") in focus area 350A. When the 15-minute time interval for timeline 303B is created in adjusted EPG 340B, the width 329B for cell 309B for video "Mystery Show" is scaled (e.g., expanded) according to the 15-minute time interval for timeline 303B (e.g., "8:00 pm-8:15 pm") in focus area 350B. Adjusting the widths of the cells in overview area 357 is described in greater detail below in conjunction with FIG. 7.

If the scheduled duration (e.g., "8:00 pm-8:15 pm") for streaming the selected video (e.g., "Short Program") is less than the maximum time interval (e.g., 30-minutes) of the focus area, the adjusted EPG 340B can include a preview area 355 that is adjacent to the focus area 350B. The preview area 355 includes a cell (e.g., cell 307B) representing another video (e.g., "The Big Brown Fox") that is scheduled to stream and play immediately after the selected video (e.g., "Short Program") on the same channel as the selected video. If the EPG includes a preview area, the cell 307A for the next scheduled video "The Big Brown Fox" is moved to the preview area 355 when the cell 306A for the selected video "Short Program" is moved to the focus area 350B. The width and height of the cell 307B in the preview area 355 can be adjusted based on a width and height that are specified in the configuration data for the preview area 355. The preview area 355 can have the same height as the focus area 350B. In some implementations, the width of the preview area 355 is the difference between the maximum width 390 and the minimum width 395 associated with the focus area.

The preview area 355 can provide a hint of information for the next video that is scheduled to be streamed and played on the same channel as the selected video. The cell 307B in the preview area 355 can include at least a portion of additional metadata (e.g., description) of the video that is scheduled to be played next. The types of metadata to include in the preview area 355 can be specified in the configuration data for the preview area.

When the cell 306A for the selected video "Short Program" is moved to the focus area 350B, the locations of the other cells (e.g., 308A, 309A, 311A) in the overview area 357A in EPG 340A are adjusted in EPG 340B. For example, the locations can be shifted up in position. When the cell 306A for the selected video "Short Program" is moved to the focus area 350B, one or more cells (e.g., cell 310) may not appear in the adjusted EPG 340B, For example, cell 310 is not displayed in the adjusted EPG 340B.

Figure 4:
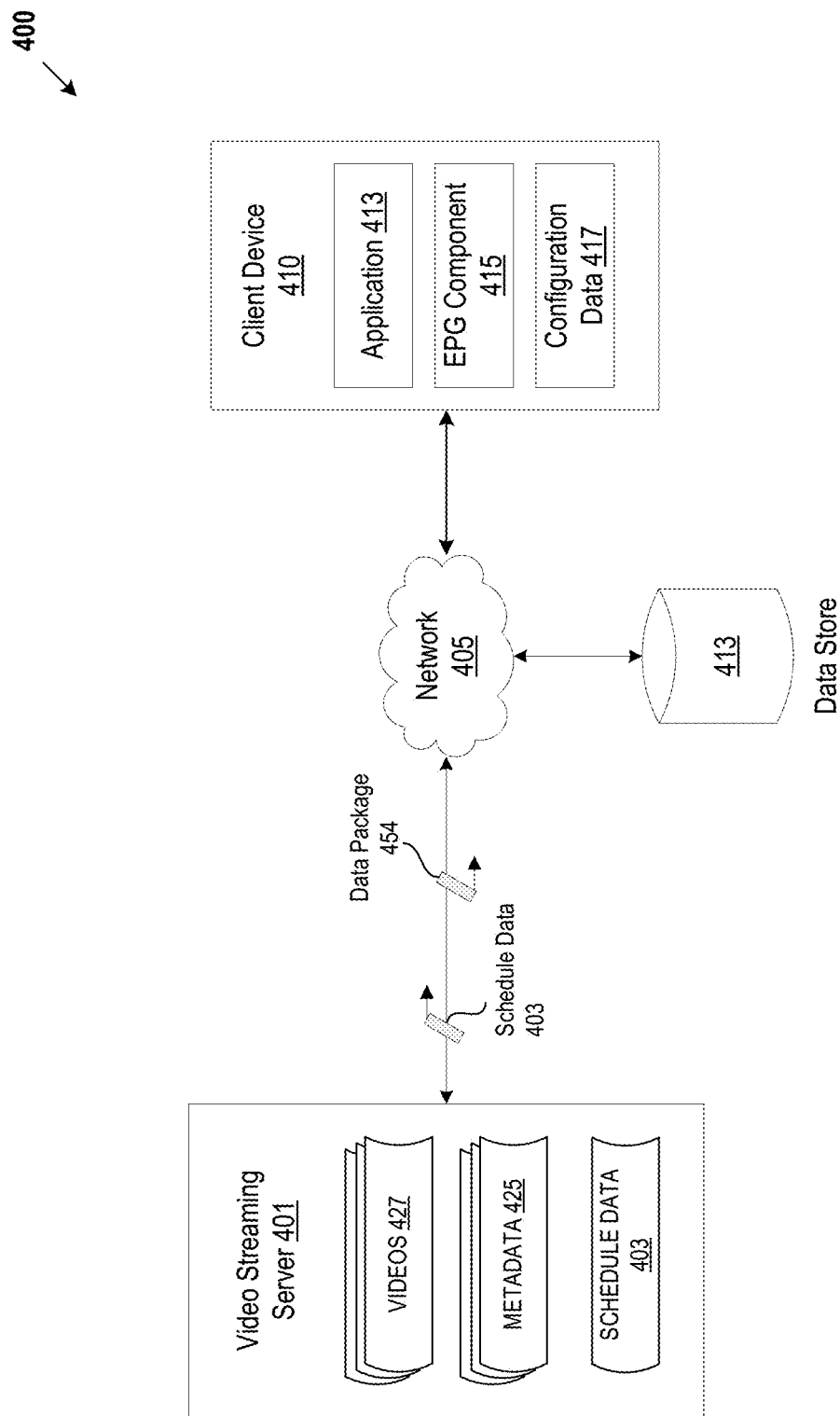
FIG. 4 illustrates exemplary system architecture for implementations of the present disclosure.

FIG. 4 illustrates exemplary system architecture 400 for implementations of the present disclosure. The system architecture 400 can include one or more client devices 410, one or more video streaming servers 401, and one or more data stores 413 coupled to each other over one or more networks 405. The network 405 may be public networks (e.g., the Internet), private networks (e.g., a local area network (LAN) or wide area network (WAN)), or a combination thereof. The video streaming server 401 can be hosted on machines, such as, and not limited to, rackmount servers, personal computers, desktop computers, media centers, or any combination of the above.

The video streaming server 401 can provide a video streaming service to one or more client devices 410. One client device is used as an example throughout this document. The video streaming server 401 can stream videos to the client device 410. In one implementation, the video streaming server 401 is part of a content sharing platform, such as content sharing platform 1020 described in greater detail below in conjunction with FIG. 10. In one implementation, the video streaming server 301 is part of a content provider platform, such as content provider platform 1095 described in greater detail below in conjunction with FIG. 10.

The video streaming server 401 may host content, such as videos 427 and metadata 425 for each of the videos 427. In one implementation, the videos 427 and metadata 425 are stored on one or more data stores 413 that are coupled to the video streaming server 401. A data store 413 can be a persistent storage that is capable of storing data. As will be appreciated by those skilled in the art, in some implementations data store 413 might be a network-attached file server, while in other implementations data store 413 might be some other type of persistent storage such as an object-oriented database, a relational database, and so forth.

In one implementation, the video streaming server 401 streams the videos 427 to the client device 410 according to a pre-defined schedule. In one implementation, the video streaming server 401 streams the videos 427 to the client device 410 according to a playlist or a set of recommended videos that are dynamically created for a particular user in real-time. In one implementation, the video streaming server 401 creates a schedule of videos to be streamed and stores schedule data 403 for the schedule. In one implementation, the schedule data 403 is stored in data store 413.

The client device 410 can include an application 413 for playing media items (e.g., videos 427). The application 413 may be, for example, a web browser that can access content served by the video streaming server 401. In another example, the application 413 may be an application (e.g., mobile application, smart TV application, streaming device application) that can access content (e.g., videos 427) served by the video streaming server 401. The client device 410 can be a computing device such as a personal computer (PCs), laptop, mobile phone, smart phone, tablet computer, netbook computer, network-connected television, etc.

The client device 410 can receive a video stream for a video 427 from the video streaming server 401, and the application 413 on the client device 410 can render the video on a display that is coupled to the client device 410 according to the schedule data 403. In one implementation, the client device 410 receives a video identifier, such as a universe resource identifier (URI) (e.g., universe resource locator (URL)), for the video 427 from the video streaming server 401, and the client device 410 uses the URI to obtain the video 427 via an Internet connection over network 405. The client device 410 receives portions of the video stream and renders the portions on a display as the portions are received.

In one implementation, the video streaming server 401 creates a data package 454 that includes the videos 427 and the metadata 425 for each of the videos 427, and sends the data package 454 to the client device 410. In one implementation, the data package 454 includes the schedule data 403 for the videos 427. In another implementation, the schedule data 403 for the videos 427 is in a separate data package created by the video stream server 401 and/or is sent separately to the client device 410.

The types of metadata 425 for each video 427 can include, for example, a video identifier, a description, a creator or owner, a thumbnail representation, a duration, statistics, a publish date, a language associated with a respective video, genre (e.g., comedy, drama, etc.), user rating data, critic rating data, film rating (e.g., Motion Picture Association of America (MPAA) film rating, TV Parental Guidelines ratings, etc.), channel associated with the video, one or more keywords associated with the video, and statistics. Examples of the statistics can include a number of views, a number of likes, a number of dislikes, a number of shares, a number of playlists including the video, and a number of comments.

The client device 410 can generate and display a user interface (UI) on a display coupled to the client device 410. The user interface can be a graphical user interface. The client device 410 can include an EPG component 415 to create and display an electronic program guide (EPG) in the UI. The EPG component 415 can communicate with or be a part of the application 413. The EPG can include a schedule for streaming and playing the videos 427. The EPG component 415 can extract information from the schedule data 403 and/or metadata 425 received from the video streaming server 401, and populate a template to create the EPG in the UI.

The EPG component 415 can dynamically adjust the content being displayed in the EPG. The EPG component 415 can display an EPG that includes a focus area and one or more overview areas. For example, the UI may display the EPG in FIGS. 1A-1C. A user can select a video in the EPG, and the EPG component 415 can dynamically change the content in the focus area in the EPG to display expanded metadata for the selected video in the focus area. For example, EPG component 415 may display a truncated title, a scheduled start time, and an incomplete scheduled end time for a video being represented in an overview area. When a user selects the video in the overview area, the EPG component 415 can display, for example, the complete title, a complete scheduled start time, a complete scheduled end time, and additional types of metadata, such as, a description, critics' rating, and users' rating for the selected video in the focus area of the EPG.

The client device 410 can store configuration data 417 for the EPG. The configuration data 417 can specify the parameters for the focus area, the overview area(s), a preview area, channel identifiers, and the visual representations (e.g., cells) for the videos in the EPG. The configuration data 417 can be configurable and user-defined.

The parameters for the focus area can specify a maximum time interval (e.g., 30-minutes) for a timeline for the focus area, a time format, a maximum width, a minimum width, a height, a location (e.g., top portion, bottom portion, in between overview areas) in the UI for the focus area, and the types of metadata (e.g., title, start time, end time, description, users' ratings, critics' ratings, thumbnail) to be included in the focus area. The parameters can also include, for each type of metadata in the focus area, a font, a font size, a font style, and a location in the cell in the focus area.

The parameters for the overview area(s) can specify the number of overview areas for the EPG, a width for a respective overview area, a height for a respective overview area, a location (e.g., top portion, bottom portion) in the UI for a respective overview area, and the types of metadata (e.g., title, start time, end time) to be included in the cells of a respective overview area. The parameters for the visual representations (e.g., cells) in a respective overview area can specify a height for each cell, and, for each type of metadata in a cell, a font, a font size, a font style, and a location in the cell in the respective overview area.

The parameters for the channel identifiers can specify whether to display an image (e.g., logo) and/or a string for a channel identifier, the dimensions (e.g., height, width) of the channel identifiers, and the locations in the EPG for the channel identifiers.

The parameters for the preview area can specify whether to include a preview area in a focus area, a width, a height, a location (e.g., top portion, bottom portion, in between overview areas) in the UI for the preview area, and the types of metadata to be included in the preview area. The parameters can also include, for each type of metadata in the preview area, a font, a font size, a font style, and a location in the cell in the preview area. The preview area is described in greater detail below in conjunction with FIG. 5 and FIG. 6.

Figure 5:
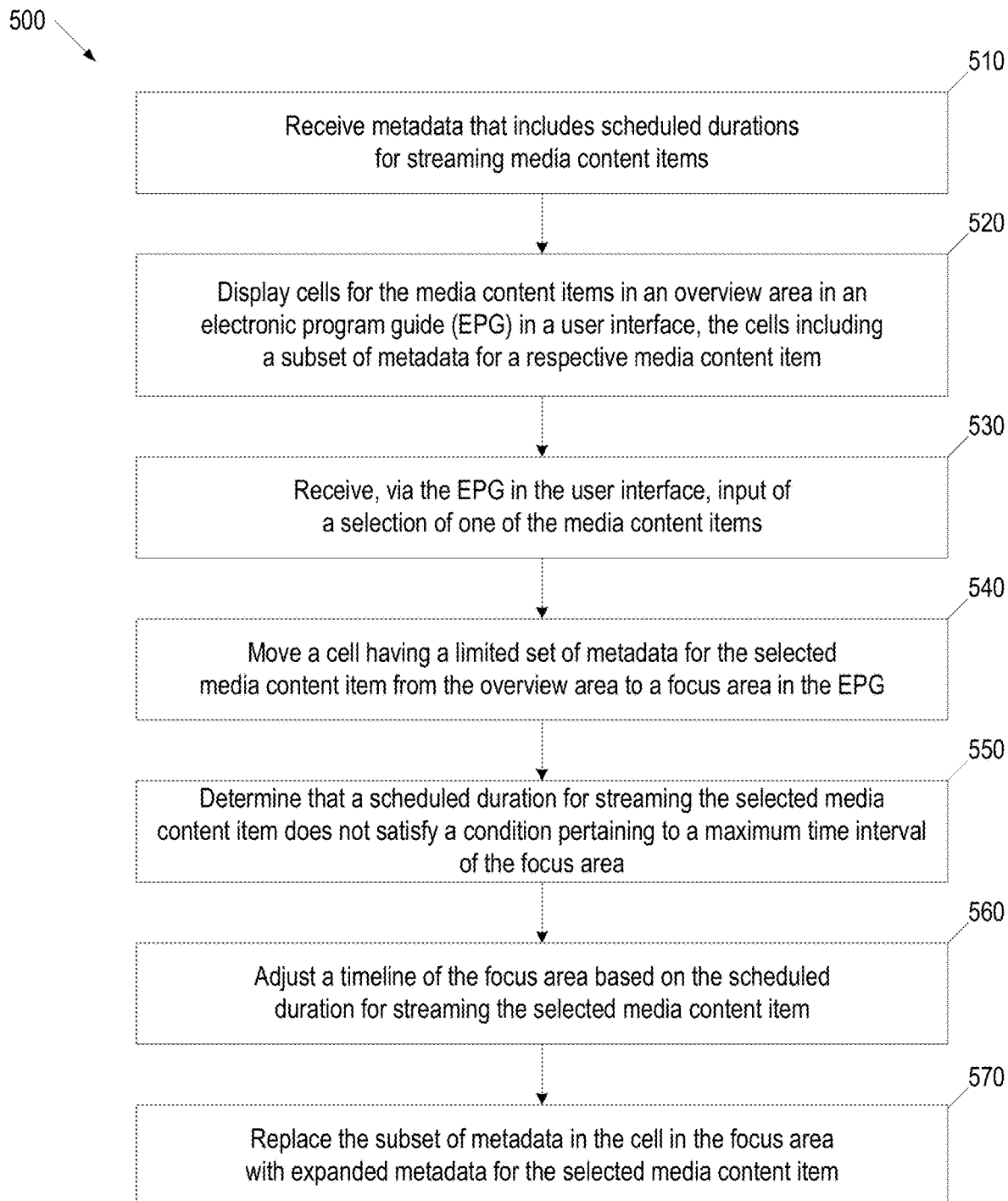
FIG. 5 depicts a flow diagram of aspects of a method for dynamically adjusting an electronic program guide, in accordance with one implementation of the present disclosure.

FIG. 5 depicts a flow diagram of aspects of a method 500 for dynamically adjusting an electronic program guide, in accordance with one implementation of the present disclosure. The method 500 is performed by processing logic that may comprise hardware (circuitry, dedicated logic, etc.), software (such as is run on a general purpose computer system or a dedicated machine), or a combination of both. In one implementation, the method 500 is performed by an EPG component 415 in a client device 410 of FIG. 4. In one implementation, a processing device of a client computing device performs method 500.

At block 510, the processing device receives metadata for media content items. The metadata can be received from a server (e.g., video streaming server 401 in FIG. 4). In one implementation, the media content items (e.g., videos) are scheduled to be streamed and played according to a pre-defined schedule. In another implementation, the media content items are scheduled to be streamed and played according to a playlist or recommendations created for a particular user. In one implementation, the media content items can be dynamically selected in real-time for a particular user. The metadata can include, for each media content item, a scheduled duration for streaming a respective media content item. The scheduled duration can be defined by a scheduled start time and end time for a respective media content item. The metadata for each media content item can further include, for example, a video identifier, a description, a creator or owner, a thumbnail representation, a duration, statistics, a publish date, a language associated with a respective video, genre (e.g., comedy, drama, etc.), user rating data, critic rating data, film rating, channel associated with the video, one or more keywords associated with the video, and statistics. Examples of the statistics can include a number of views, a number of likes, a number of dislikes, a number of shares, a number of playlists including the video, and a number of comments.

At block 520, the processing device displays cells for the media content items in an overview area in an EPG in a user interface. The cells in the overview area include a limited set of metadata for a respective media content item. For example, the limited set of metadata may include a truncated title and/or a truncated scheduled duration. The processing device can extract metadata items from the metadata and populate a template to display the limited sets of metadata for the media content items in the cells in the overview area in the EPG.

At block 530, the processing device receives, via the EPG in the UI, input of a selection of one of the media content items. The selected media content item can be one of the videos in the overview area of the EPG or a video in a preview area in the EPG. A preview area is described in greater detail below in conjunction with FIG. 6. In one example, the input is a selection of a cell of a media item. In another example, the input is a swipe gesture to scroll the content of the overview area or a preview area. In another example, the input is a select and drag operation of a cell of a media content item to a focus area in the EPG.

At block 540, in response to the input selection, the processing device moves a cell having the limited set of metadata for the selected media content item to the focus area in the EPG. At block 550, the processing device determines that a scheduled duration for streaming the selected media content item does not satisfy a condition pertaining to a maximum time interval for the focus area. The processing device can determine the scheduled duration for the selected media content item, for example, by extracting the scheduled duration and/or the scheduled start time and end time for the selected media content item from the received metadata. The processing device can compare the scheduled duration to the maximum time interval for the focus area, for example, that is stored in configuration data.

At block 560, the processing device adjusts a timeline of the focus area based on the scheduled duration for streaming the selected media content item. When the scheduled duration is less than or equal to the maximum time interval of the focus area, the processing device can set the time interval for timeline to match the scheduled duration for the selected media content item. The processing device can set the beginning time and end time for timeline to match the scheduled start time and scheduled end time for the selected media content item.

The processing device can also adjust a width of the cell for the selected media content item in the focus area to match a maximum width parameter or a minimum width parameter of the focus area to enable displaying expanded metadata in the cell in the focus area. The width of the focus area can be larger than the width of the cell for the selected media content item in the overview area. The processing device can adjust (e.g., expand) a height of the cell for the selected media content item in the focus area to match a height of the focus area to enable displaying additional metadata in the cell in the focus area. The height of the focus area can be larger than the height of the cell for the selected media content item in the overview area. The processing device can adjust the widths of the remaining cells in the overview area based on the adjusted timeline of the focus area, as described in greater detail below in conjunction with FIG. 7.

At block 570, the processing device replaces the subset of metadata in the cell in the focus area with expanded metadata for the selected media content item. For example, the expanded metadata can include a complete title for the selected media content item. The expanded metadata can include additional types of metadata, such as, and not limited to a description, statistics, users' reviews, critics' reviews, users' ratings, critics' rating, publication data, content provider, content owner, genre, thumbnail, cast, etc.

In one implementation, the processing device determines whether the selected media content item is currently streaming according to the schedule. If the selected media content item is currently streaming, the processing device can play a sample of the selected media content item in the cell in the focus area. The sample can played for a pre-defined period of time specified in configuration data. The sample can be played as an underlay of the display of the expanded metadata of the selected media content item in the focus area. If the selected media content item is not currently streaming, the processing device can display an image of a frame of the selected media content item as an underlay of the display of the expanded metadata of the selected media content item in the focus area. The image can be included in the metadata received from the video streaming server.

Figure 6:
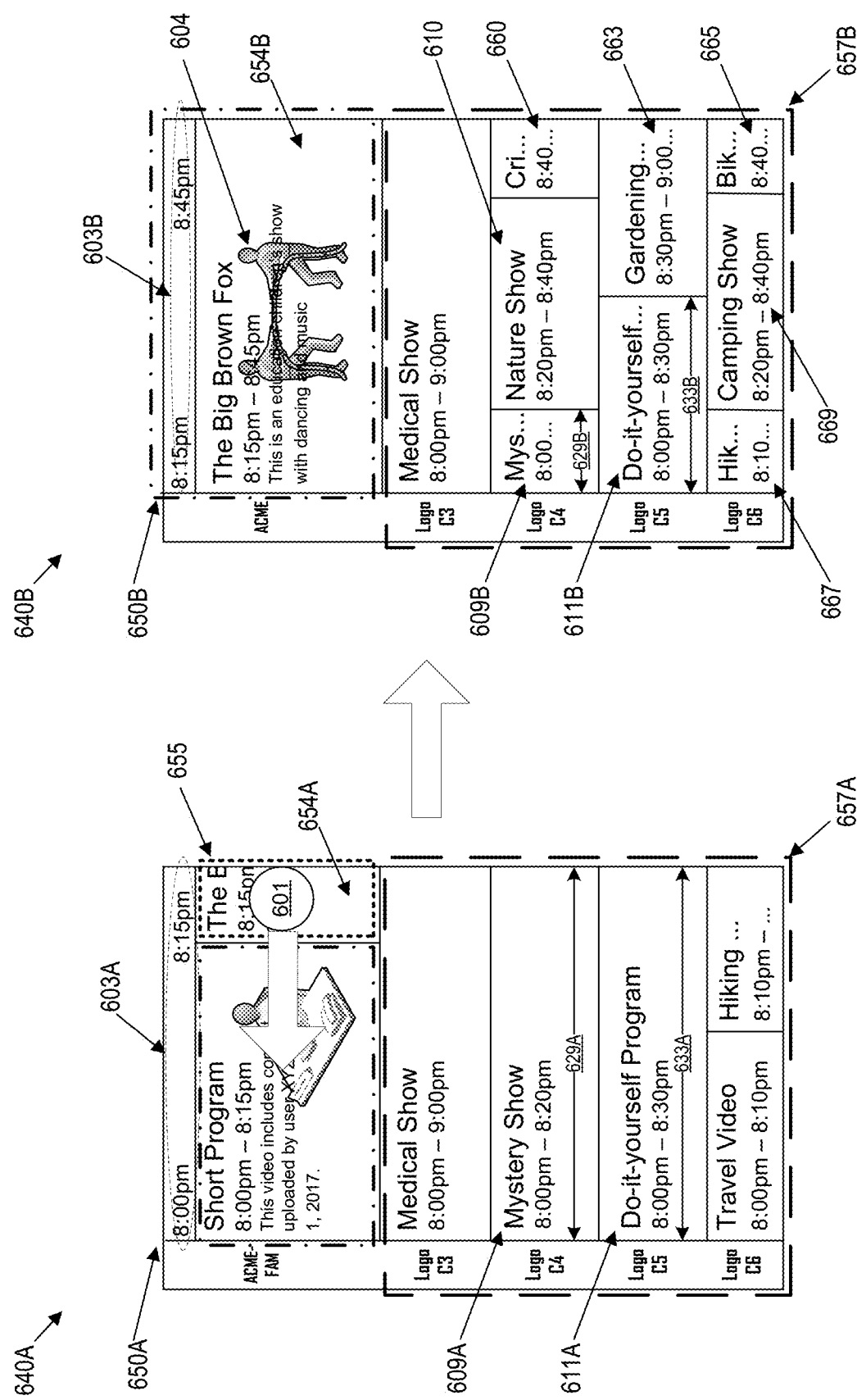
FIG. 6 depicts an example of selecting a media content item in a preview area in an EPG for a focus area in the EPG and dynamically adjusting a timeline of the focus area based on the selected media content item, in accordance with one implementation of the present disclosure.

FIG. 6 depicts an example of selecting a media content item in a preview area in an EPG for a focus area in the EPG and dynamically adjusting a timeline of the focus area based on the selected media content item, in accordance with one implementation of the present disclosure. EPG 640A depicts a cell in the focus area 650A, a cell in the preview area 655, and cells in the overview area 657A as a user selects a media content item (e.g., video) from preview area 655 for focus area 650A. For example, a user can select (e.g., tap) location 601 (or any cell in the EPG 640A) and swipe in a horizontal direction (e.g., right-to-left) towards the focus area 650A. In one implementation, an EPG component (e.g., EPG component 315 in FIG. 3) in a client device, interprets the swipe gesture as a selection of the video (e.g., "The Big Brown Fox") that is being represented by the cell 654A in the preview area 655. In another implementation, the input for the selection may be a user selecting the cell 654A in the preview area 655, dragging the selected cell 654A to the focus area 650A, and releasing the dragged cell. In the preview area 655, the cell 654A for the selected "The Big Brown Fox" video displays a portion of a set of expanded metadata for the selected video. For example, the expanded metadata in cell 654A includes a portion of the title, a scheduled start time, a scheduled end time, and a description.

The EPG component can automatically move the selected cell 654A from the preview area 655 to the focus area 650A. EPG 640B is a dynamically adjusted version of EPG 640A and depicts the cell in the focus area 650B and cells in the overview area 657B after a user has selected a video (e.g., "The Big Brown Fox") from the preview area 655 for the focus area 650B.

The EPG component can determine whether a scheduled duration for streaming the selected video is less or equal than the maximum time interval of the focus area, and can create a timeline 603B for the focus area 650B based on the determination. For example, the EPG component may determine that the scheduled duration (e.g., 8:15 pm-8:45 pm) for streaming the selected video "The Big Brown Fox" is equal to a maximum time interval (e.g., 30-minutes) of the focus area 650B. If the scheduled duration is greater than the maximum time interval, the timeline 503B of focus area 550B is created to match the maximum time interval. The beginning of the timeline 603B can match the scheduled start time for the selected video, and the end of the timeline 603B can be determined based on the maximum time interval (e.g., 30-minutes). For example, the EPG component changes the "8:00 pm-8:15 pm" timeline 603A in EPG 640A to "8:15 pm-8:45 pm" in timeline 603B in the dynamically adjusted EPG 640B.

In one implementation, if the height of the selected cell 654A is different from the height of the focus area 650A, the EPG component can adjust the height of cell 654A to match a default height associated with the focus area 650A. The EPG component can also adjust a width of the selected cell 654A based on the maximum time interval (e.g., 30-minutes) of the focus area 650B. If the scheduled duration for streaming the selected video is greater than or equal to the maximum time interval of the focus area, the width of the cell 654B for the selected video in the focus area 650B is set to a maximum width (e.g., maximum width 590 in FIG. 5).

In this example, the scheduled duration (e.g., 8:15 pm-8:45 pm) for streaming the selected video "The Big Brown Fox" is equal to the maximum time interval (e.g., 30-minutes) of the focus area 650B, and the width of cell 654B for the selected video in the focus area 650B is set to the maximum width.

With the expanded width and/or height of the focus area 650B, the EPG component can display more of the expanded metadata (e.g., title, scheduled start time, scheduled end time, description) in the cell 654B. For example, in cell 654B in focus area 650B, a complete title is displayed, a complete scheduled start time and scheduled end time are displayed, a complete description is displayed, and a sample 604 is displayed. The sample 604 can be an image (e.g., thumbnail) or a rendering of a short segment of the selected video. The EPG component can determine whether the selected video is currently streaming, for example, by comparing the scheduled duration for the video to the current time. If the selected video is currently streaming, the EPG component can play the portion of the selected video that is currently streaming as the sample in the focus area. The EPG component can play the sample as an underlay of a display of the expanded metadata of the selected video. If the selected video is currently streaming, the EPG component can display an image of a frame of the selected video in the focus area 650B as an underlay of a display of the expanded metadata of the selected video in the focus area 650B.

The EPG component can also adjust the widths of other cells in the overview area 657B based on the adjusted timeline 603B (e.g., "8:15 pm-8:45 pm") of the focus area 650B. For example, in EPG 640A, cell 609A for video "Mystery Show" has a width 629A, which is scaled to timeline 603A (e.g., "8:00 pm-8:15 pm") in focus area 650A. When timeline 603B is created in adjusted EPG 640B, the cell 609B for video "Mystery Show" has an adjusted width 629B, which is scaled (e.g., reduced) according to timeline 603B (e.g., "8:15 pm-8:45 pm") and the beginning time in the timeline 603B in focus area 650B.

When the cell 654A for the selected video "The Big Brown" is moved to the focus area 650B, cells for new video representations can be displayed in the overview area 657B in EPG 5640B. For example, the cells 610, 660, 663, 665, 669 can include representations for videos that were not previously represented in EPG 640A. The new cells can include a limited set of metadata for a respective video.

Figure 7:
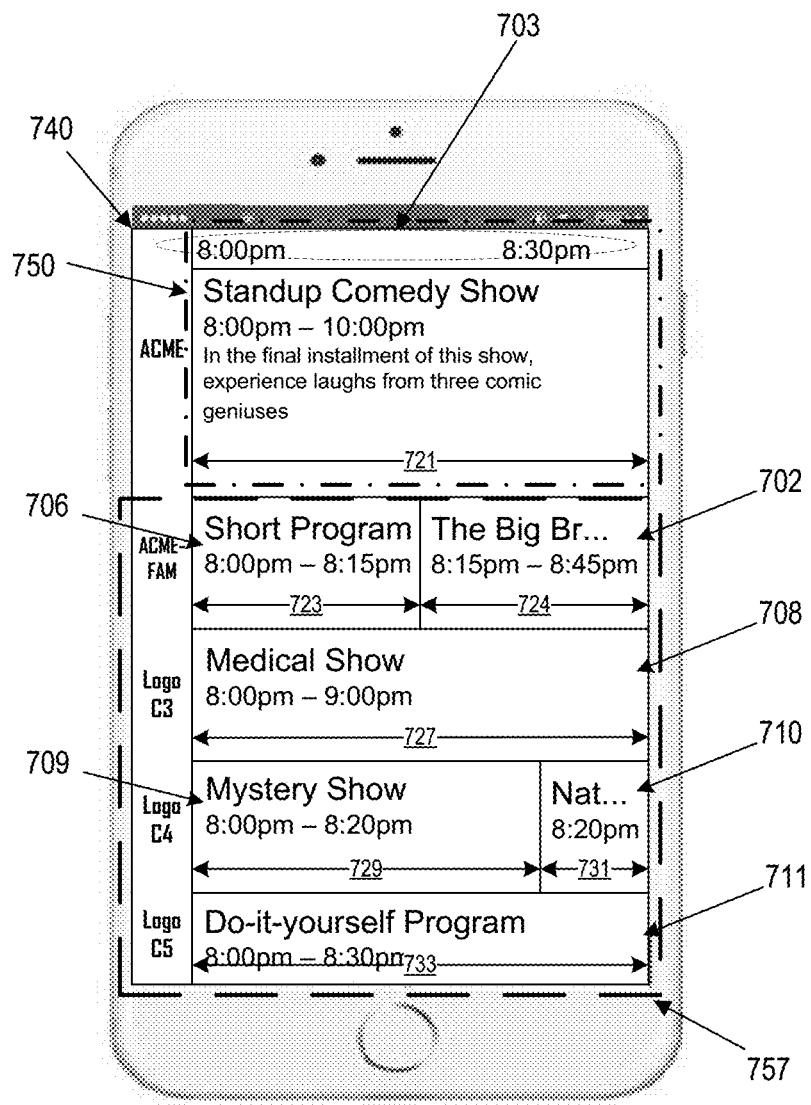
FIG. 7 illustrates an example of widths of cells in a dynamically adjustable EPG, in accordance with one implementation of the disclosure.

FIG. 7 illustrates an example of widths of cells in a dynamically adjustable EPG 740, in accordance with one implementation of the disclosure. The widths of the cells in the EPG 740, and the timeline 703 of the focus area 750 can be dynamically adjusted. The widths of the cells in the overview area 757 can be dynamically defined based on (i) the time interval of the current timeline 703 of the focus area 750, (ii) the scheduled duration for streaming the respective video being represented by a respective cell in the overview area 757, and (iii) the scheduled start time and scheduled end time for the video being represented in the overview area 757.

In one implementation, when (i) the scheduled duration of a video being represented by a cell in the overview area 757 is equal to the time interval for the timeline 703 of the focus area 750, and (ii) the scheduled start time and end time of the video in the overview 757 can be mapped to the timeline 703 of the focus area 750, then the width of the cell of the video in the overview area 757 can be dynamically adjusted to match the width 721 of the focus area 750. For example, the timeline 703 is currently a 30-minute interval. The video "Do-it-yourself Program" represented by cell 711 may have a scheduled duration of 30-minutes (e.g., 8:00 pm-8:30 pm), which is equal to the 30-minute time interval for timeline 703 of the focus area 750. The scheduled start time "8:00 pm" and the scheduled end time "8:30 pm" can be mapped to the timeline 703 of the focus area 750. Thus, the width 733 of cell 711 is adjusted to match the width 721 of the focus area 750.

In one implementation, when (i) the scheduled duration of a video being represented by a cell in the overview area 757 is equal to the time interval for the timeline 703 of the focus area 750, and (ii) the scheduled start time and end time of the video in the overview 757 cannot be mapped to the timeline 703 of the focus area 750, then the width of the cell of the video in the overview area 757 can be dynamically adjusted to be less than the width 721 of the focus area 750. For example, the video "The Big Br . . . " represented by cell 702 may have a scheduled duration of 30-minutes (e.g., 8:15 pm-8:45 pm), which is equal to the 30-minute time interval for timeline 703 of the focus area 750. The scheduled start time "8:15 pm" can be mapped to the timeline 703 of the focus area 750. However, the scheduled end time "8:45 pm" cannot be mapped to the timeline 703 of the focus area 750. Thus, the width 724 of cell 703 is adjusted to be less than the width 721 of the focus area 750.

In one implementation, when the scheduled duration of a video being represented by a cell in the overview area 757 is greater than the time interval for the timeline 703 of the focus area 750, then the width of the cell of the video in the overview area 757 can be dynamically adjusted to match the width 721 of the focus area 750. For example, the video "Medical Show" represented by cell 708 may have a scheduled duration of one hour (e.g., 8:00 pm-9:00 pm), which is greater than the time interval of timeline 703. The width 727 of cell 708 is adjusted to match the width 721 of the focus area 750.

In one implementation, when (i) a scheduled duration of a video being represented by a cell in overview area 757 is less than the time interval for the timeline 703 of the focus area 750, and the scheduled start time and end time of the video in the overview 757 can be mapped to the timeline 703 of the focus area 750, then the width of the cell of video in the overview 757 can be scaled to correspond to the width 721 of the focus area 750. For example, the video "Short Program" represented by cell 706 has a scheduled duration of 15 minutes, which is less than the 30-minute time interval for the timeline 703 of the focus area 750. Since the scheduled start time "8:00 pm" and end time "8:15 pm" for "Short Program" can be mapped to the timeline 703 of the focus area 750, the width 723 can be scaled based on the width 721 of the focus area 750. For example, the width 723 of the cell 706 for video "Short Program" can be set to half of the width 721 of timeline 703. In another example, the video "Mystery Show" represented by cell 709 has a scheduled duration of 20 minutes, which is less than the 30-minute time interval for the timeline 103 of the focus area 750. Since the scheduled start time "8:00 pm" and end time "8:20 pm" for "Mystery Show" can be mapped to the timeline 703 of the focus area 750, the width 729 can be scaled based on the width 721 of the focus area 705. For example, the width 729 of the cell 709 for video "Mystery Show" is set to two thirds of the width 729 of timeline 703.

In one implementation, when a scheduled duration of a video is less than the time interval for the timeline 703 of the focus area 750, and the scheduled start time and end time of the video cannot be mapped to the timeline 703 of the focus area 750, the width of the cell of video can be less than the width 721 of the focus area 750. For example, the video "Nature Show" represented by cell 710 may have a scheduled duration of 20 minutes (e.g., 8:20 pm-8:40 pm), which is less than the 30-minute time interval for the timeline 703 of the focus area 150A. "Nature Show" may have a scheduled start time "8:20 pm" that can be mapped to the timeline 703 of the focus area 750. However, the scheduled end time "8:40 pm" cannot be mapped to the timeline 703 of the focus area 750. Thus, the width 731 of cell 710 for the video "Nature Show" is adjusted to be less than the width 721 of the focus area 750.

Figure 8:
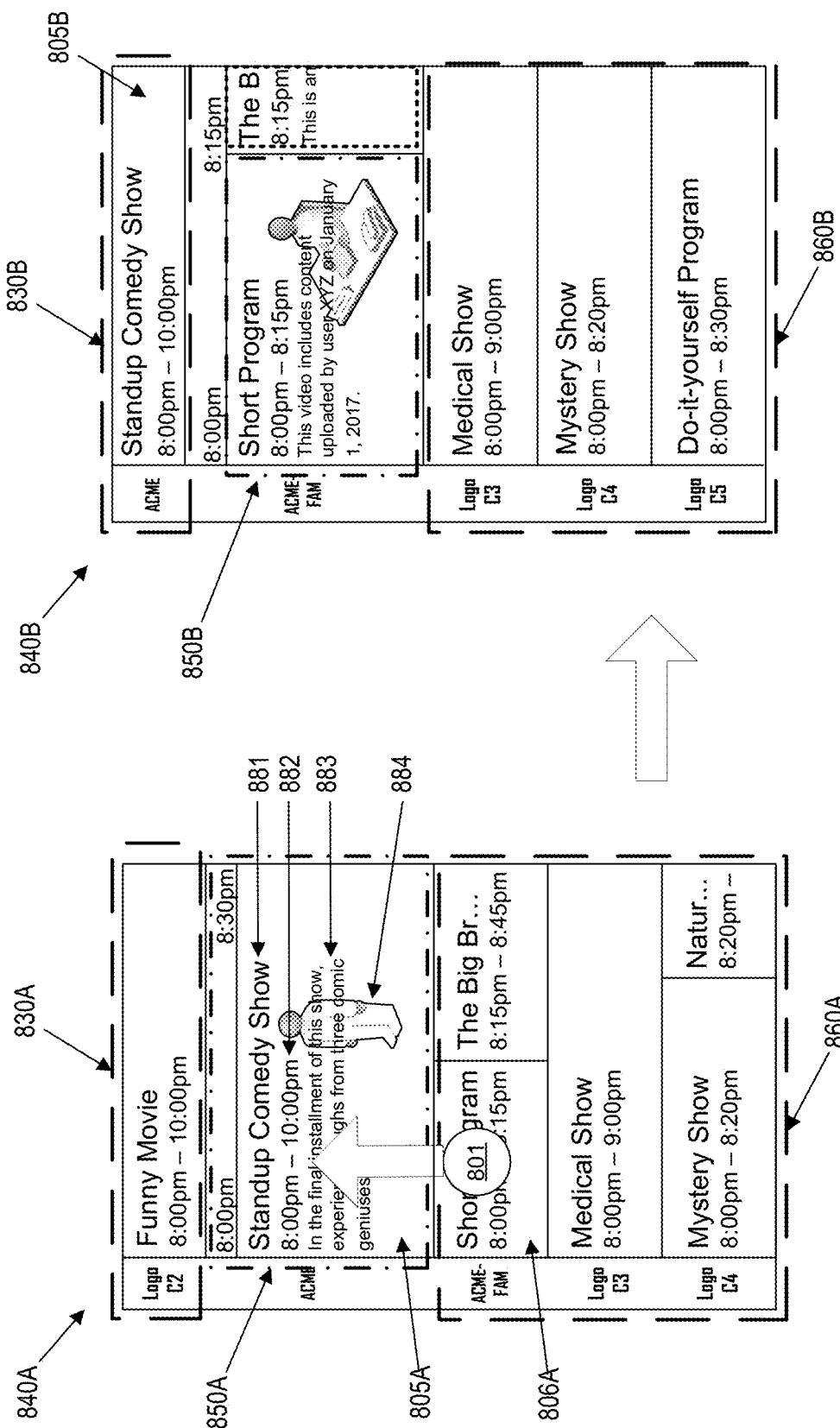
FIG. 8 depicts an example of an EPG having multiple overview areas, in accordance with one implementation of the present disclosure.

FIG. 8 depicts an example of an EPG having multiple overview areas, in accordance with one implementation of the present disclosure. EPG 840A depicts focus area 850A and overview areas 830A, 860A. In EPG 840A, the focus area 850A displays expanded metadata for the video "Standup Comedy Show". For example, a title 881, scheduled start time and scheduled end time 882, description 883, and sample 884 are displayed in focus area 850A.

When a user selects location 801 and swipes in a vertical direction upwards towards the focus area 850A, the EPG component automatically moves the cell 806A for the selected video to the focus area 850A. EPG 840B is a dynamically adjusted version of EPG 840A in response to a user selecting the video "Short Program".

When cell 806A is moved to the focus area, the EPG component can move the cell 805A for "Standup Comedy Show" to overview area 830B. The cell 805B for the video "Standup Comedy Show" in overview area 830B can be reduced in size (height reduced) and can display a limited set of metadata (e.g., title, scheduled start time, scheduled end time).

Figure 9:
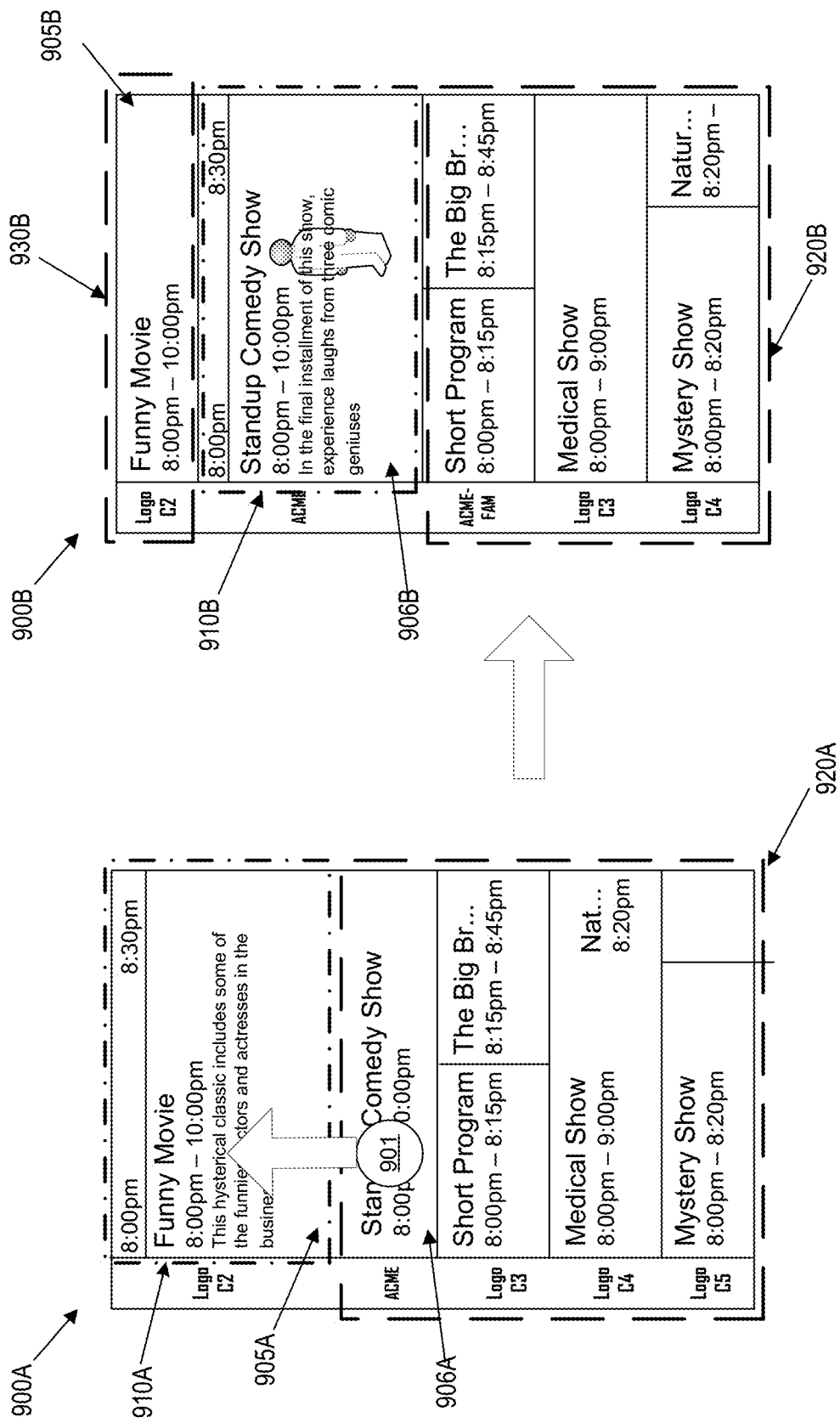
FIG. 9 depicts an example of an EPG transitioning from having one overview area to multiple overview areas, in accordance with one implementation of the present disclosure.

FIG. 9 depicts an example of an EPG transitioning from having one overview area to multiple overview areas, in accordance with one implementation of the present disclosure. EPG 900A depicts focus area 910A and one overview area 920A. In EPG 900A, the focus area 910A displays expanded metadata for the video "Funny Movie". Just one overview area 906A may be displayed in the EPG 900A based on the videos included in a playlist. For example, the playlist may include a default order of videos where "Funny Movie" is the first video in the playlist and there are no other videos above "Funny Movie" in the playlist. As such, the EPG 900A may not display another overview area above the focus area 910A. That is, in one implementation, when the video selected in the focus area 910A is the first video in the playlist, just one overview area 920A may be displayed below the focus area 910.

When a user selects location 901 and swipes in a vertical direction upwards towards the focus area 910A, the EPG component automatically moves the cell 906A for the selected video to the focus area 910A. EPG 900B is a dynamically adjusted version of EPG 900A in response to a user selecting the video "Standup Comedy Show". Also, when cell 906A is moved to the focus area 910B, the EPG component can move the cell 905A for "Funny Movie" to another overview area 930B above the focus area 910B. The cell 905B for the video "Funny Movie" in overview area 930B can be reduced in size (height reduced) and can display a limited set of metadata (e.g., title, scheduled start time, scheduled end time). As depicted, the dynamically adjusted EPG 900B includes two overview areas 930B and 920B. Overview area 930B is located above the focus area 910B and overview area 920B is located below the focus area 910B. Displaying the overview area 930B with a video ("Funny Movie") above the focus area 910B may provide an indication to the user that there are additional videos above the video ("Standup Comedy Show") currently selected in the focus area 910B.

Figure 10:
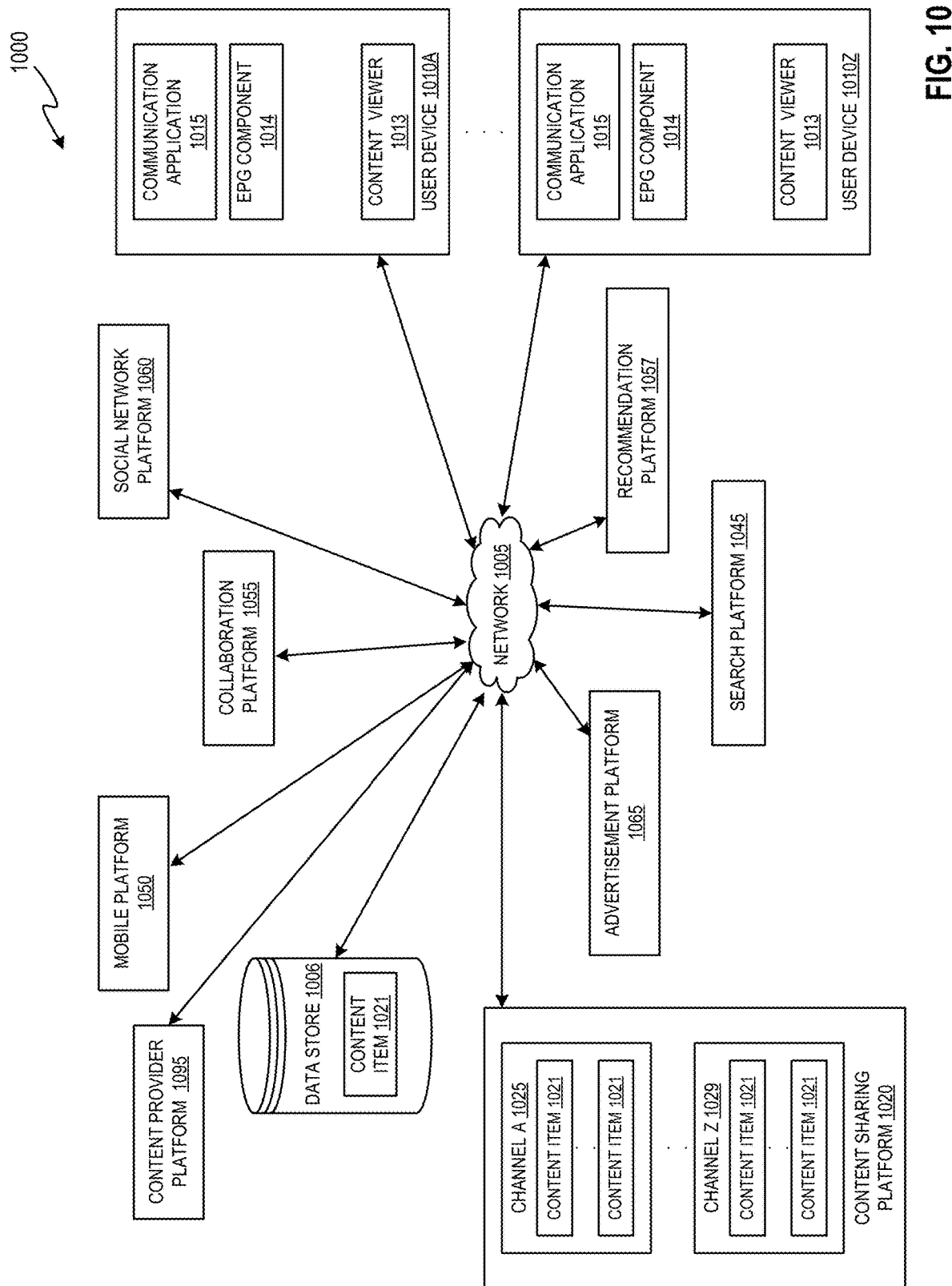
FIG. 10 illustrates an example of system architecture for dynamically adjusting an electronic program guide, in accordance with one implementation of the disclosure.

FIG. 10 illustrates an example of system architecture 1000 for dynamically adjusting an electronic program guide, in accordance with one implementation of the disclosure. The system architecture 1000 includes user devices 1010A through 1010Z, one or more networks 1005, one or more data stores 1006, one or more servers 1030, and one or more platforms (e.g., content sharing platform 1020, recommendation platform 1057, advertisement platform 1065, mobile platform 1050, social network platform 1060, search platform 1045, content provider platform 1095, and collaboration platform 1055). The platforms can be one or more computing devices (such as a rackmount server, a router computer, a server computer, a personal computer, a mainframe computer, a laptop computer, a tablet computer, a desktop computer, etc.), data stores (e.g., hard disks, memories, and databases), networks, software components, and/or hardware components.

The one or more networks 1005 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 1000 are not directly connected to each other. In one implementation, architecture 1000 includes separate networks 1005.

The one or more data stores 1006 can be memory (e.g., random access memory), cache, drives (e.g., hard drive), flash drives, database systems, or another type of component or device capable of storing data. The one or more data stores 1006 can include multiple storage components (e.g., multiple drives or multiple databases) that may also span multiple computing devices (e.g., multiple server computers). The data stores 1006 can be persistent storage that are capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Content items 1021 (media content items) can be stored in one or more data stores 1006. The data stores 1006 can be part of one or more platforms. Examples of a content item 1021 can include, and are not limited to, digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. Content item 1021 is also referred to as a media item. For brevity and simplicity, an online video (also hereinafter referred to as a video) is used as an example of a content item 1021 throughout this document.

The content items 1021 can be provided by content providers. A content provider can be a user, a company, an organization, etc. A content provider can provide contents items 1021 that are video advertisements. A content provider that provides video advertisements is hereinafter referred to as an advertiser. For example, a content item 1021 may be a video advertisement for a car provided by a car advertiser.

A service provider can charge an advertiser a fee, for example, when the service provider provides the advertisements on user devices 1010A-1010Z to be viewed by users.

The user devices 1010A-1010Z can include devices, such as, smart phones, cellular telephones, personal digital assistants (PDAs), portable media players, netbooks, laptop computers, electronic book readers, tablet computers, desktop computers, set-top boxes, gaming consoles, televisions, and the like. The user devices 1010A-1010Z can be client devices (e.g., client device 410 in FIG. 4).

The individual user devices 1010A-1010Z can include a communication application 1015. A content item 1021 can be consumed via a communication application 1015, the Internet, etc. As used herein, "media," "media item," "online media item," "digital media," "digital media item," "content," and "content item" can include an electronic file that can be executed or loaded using software, firmware or hardware configured to present a content item. In one implementation, the communication applications 1015 may be applications that allow users to compose, send, and receive content items 1021 (e.g., videos) over a platform (e.g., content sharing platform 1020, recommendation platform 1057, advertisement platform 1065, mobile platform 1050, social network platform 1060, search platform 1045, collaboration platform 1055, and content provider platform 1095) and/or a combination of platforms and/or networks.

For example, the communication application 1015 may be a social networking application, video sharing application, video streaming application, video on demand application, photo sharing application, chat application, mobile application of a content provider or any combination of such applications. The communication application 1015 in a user device can render, display, and/or present one or more content items 1021 (e.g., videos) to one or more users. For example, the communication application 1015 can provide one or more user interfaces (e.g., graphical user interfaces) to be rendered in a display of a user device for sending, receiving and/or playing videos.

In one implementation, the individual user devices 1010A-1010Z includes a content viewer 1013 (e.g., application 413 in FIG. 4) to render, display, and/or present content items 1021 (e.g., videos) to one or more users. In one implementation, a content viewer 1013 is embedded in an application (e.g., communication application 1015). In another implementation, the content viewer 1013 may be a standalone application (e.g., mobile application, desktop application, gaming console application, television application, etc.), such as communication application 1015, that allows users to consume (e.g., play, display) content items 1021, such as videos, images, documents (e.g., web pages), etc. For example, the content viewer 1013 may be a web browser that can access, retrieve, present, and/or navigate content (e.g., web pages such as Hyper Text Markup Language (HTML) pages, digital media items, etc.) served by a web server of a platform. In another example, the content viewer 1013 may display an embedded media player (e.g., a Flash® player or an HTML5 player) that is embedded in a document (e.g., a web page).

The content viewers 1013 can be provided to the user devices 1010A-1010Z by a server 1030 and/or a platform. For example, the content viewers 1013 may be embedded media players that are embedded in documents (e.g., web pages) provided by the content sharing platform 1020. In another example, the content viewers 1013 may be applications that are downloaded from a platform (e.g., content sharing platform 1020, recommendation platform 1057, advertisement platform 1065, mobile platform 1050, social network platform 1060, search platform 1045, collaboration platform 1055, and content provider platform 1095). In another example, the content viewers 1013 may be stand-alone applications that are pre-installed on the user devices 1010A-1010Z.

In one implementation, the individual user devices 1010A-1010Z includes an EPG component 1014 (e.g., EPG component 415 in FIG. 4) to dynamically adjust an electronic program guide.

The content provider platform 1095 can provide a service and the content provider can be the service provider. For example, a content provider may be a video streaming service provider that provides a media streaming service via a communication application 1015 for users to play videos, TV shows, video clips, audio, audio clips, and movies, on user devices 1010A-1010Z via the content provider platform 1095.

The social network platform 1060 can provide an online social networking service. The social network platform 1060 can provide a communication application 1015 for users to create profiles and perform activity with their profile. Activity can include updating a profiling, exchanging messages with other users, posting status updates, photos, videos, etc. to share with other users, evaluating (e.g., like, comment, share, recommend) status updates, photos, videos, etc., and receiving notifications of other users activity.

The mobile platform 1050 can be and/or include one or more computing devices (e.g., servers), data stores, networks (e.g., phone network, cellular network, local area network, the Internet, and/or a combination of networks), software components, and/or hardware components that can be used to allow users to connect to, share information, and/or interact with each other using one or more mobile devices (e.g., phones, tablet computers, laptop computers, wearable computing devices, etc.) and/or any other suitable device. For example, the mobile platform 1050 may enable telephony communication, Short Message Service (SMS) messaging, Multimedia Message Service (MIMS) messaging, text chat, and/or any other communication between users. The mobile platform 1050 can support user communications via video messaging, video chat, and/or videoconferences.

The collaboration platform 1055 can enable collaboration services, such as video chat, video messaging, and audio and/or videoconferences (e.g., among the users of devices 1010A-1010Z) using, for example, streaming video or voice over IP (VoIP) technologies, cellular technologies, LAN and/or WAN technologies, and may be used for personal, entertainment, business, educational or academically oriented interactions.

The recommendation platform 1057 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to generate and provide content recommendations (e.g., articles, videos, posts, news, games, etc.). The recommendation platform 1057 can include one or more recommendation servers.

The search platform 1045 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to allow users to query the one or more data stores 206 and/or one or more platforms and receive query results.

The advertisement platform 1065 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used provide video advertisements.

The content sharing platform 1020 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide one or more users with access to content items 1021 and/or provide the content items 1021 to one or more users. For example, the content sharing platform 1020 may allow users to consume, upload, download, and/or search for content items 1021. In another example, the content sharing platform 1020 may allow users to evaluate content items 1021, such as, approve of ("like"), dislike, recommend, share, rate, and/or comment on content items 1021. In another example, the content sharing platform 1020 may allow users to edit content items 1021. The content sharing platform 1020 can also include a website (e.g., one or more webpages) and/or one or more applications (e.g., communication applications 1015) that may be used to provide one or more users with access to the content items 1021, for example, via user devices 1010A-1010Z. Content sharing platform 1020 can include any type of content delivery network providing access to content items 1021.

The content sharing platform 1020 can include multiple channels (e.g., Channel A 1025 through Channel Z 1029). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 1025 may include videos Y and Z. A channel can be associated with an owner, who is a user that can perform actions on the channel. The data content can be one or more content items 1021. Although channels are described as one implementation of a content sharing platform, implementations of the disclosure are not limited to content sharing platforms that provide content items 1021 via a channel model.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 11:
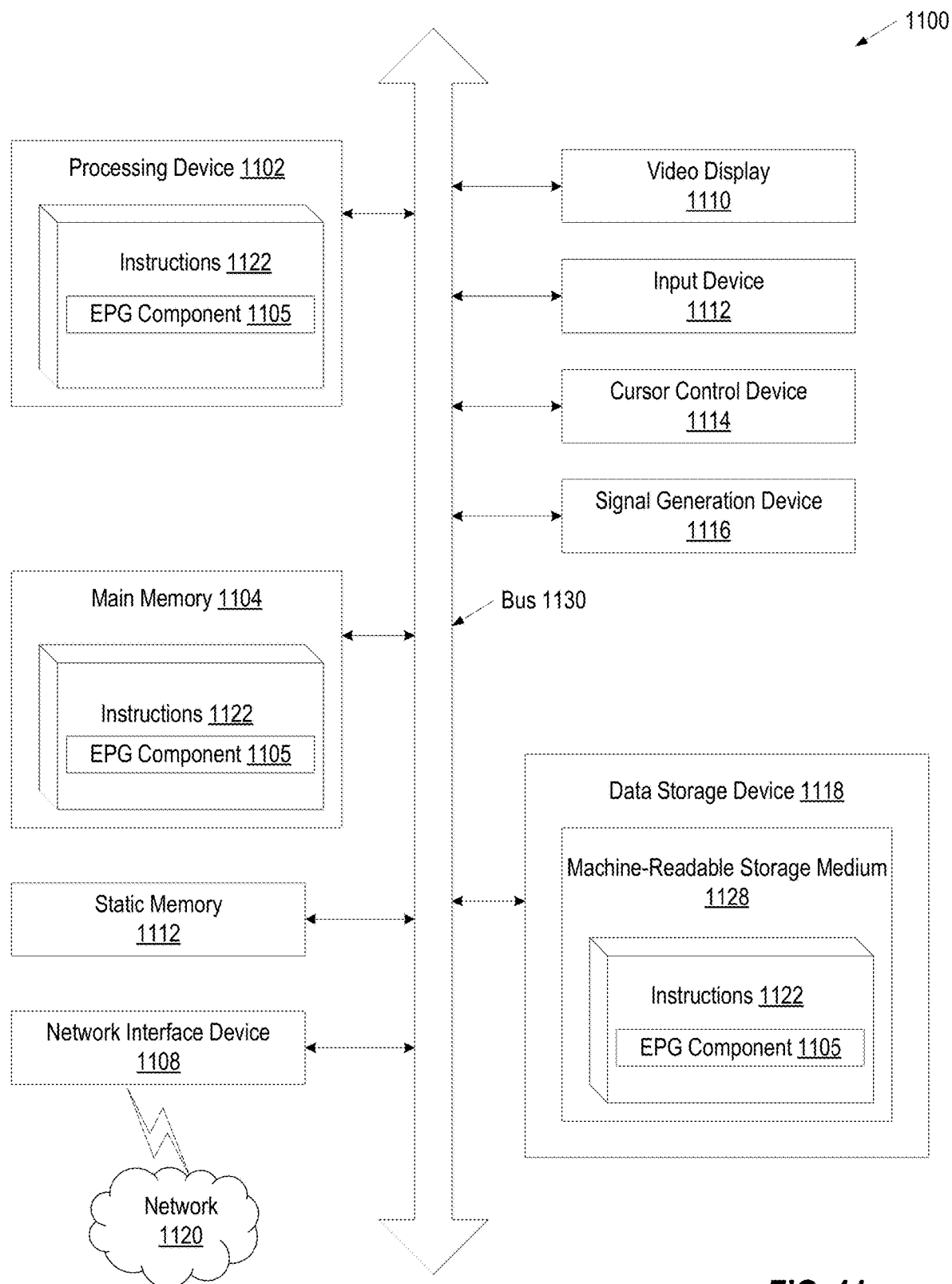
FIG. 11 depicts a block diagram of an example computing device operating in accordance with one or more aspects of the present disclosure.

FIG. 11 illustrates a diagram of a machine in an example form of a computer system 1100 within which a set of instructions, for causing the machine to perform any one or more of the methodologies discussed herein, can be executed, in accordance with one implementation of the present disclosure. The computer system 1100 can be client device 401 in FIG. 4. The machine can operate in the capacity of a client machine in client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processing device (processor) 1102, a main memory 1104 (e.g., read-only memory (ROM), flash memory, dynamic random access memory (DRAM) such as synchronous DRAM (SDRAM), double data rate (DDR SDRAM), or DRAM (RDRAM), etc.), a static memory 1106 (e.g., flash memory, static random access memory (SRAM), etc.), and a data storage device 1118, which communicate with each other via a bus 1130.

Processor (processing device) 1102 represents one or more general-purpose processing devices such as a microprocessor, central processing unit, or the like. More particularly, the processor 1102 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 can also be one or more special-purpose processing devices such as an application specific integrated circuit (ASIC), a field programmable gate array (FPGA), a digital signal processor (DSP), network processor, or the like. The processor 1102 is configured to execute instructions 1122 for performing the operations and steps discussed herein.

The computer system 1100 can further include a network interface device 1108. The computer system 1100 also can include a video display unit 1110 (e.g., a liquid crystal display (LCD) or a cathode ray tube (CRT)), an input device 1112 (e.g., a keyboard, and alphanumeric keyboard, a motion sensing input device, touch screen), a cursor control device 1114 (e.g., a mouse), and a signal generation device 1116 (e.g., a speaker).

The data storage device 1118 can include a non-transitory machine-readable storage medium 1128 (also computer-readable storage medium) on which is stored one or more sets of instructions 1122 (e.g., software) embodying any one or more of the methodologies or functions described herein. The instructions 1122 can also reside, completely or at least partially, within the main memory 1104 and/or within the processor 1102 during execution thereof by the computer system 1100, the main memory 1104 and the processor 1102 also constituting machine-readable storage media. The instructions 1122 can further be transmitted or received over a network 1120 via the network interface device 1108.

In one implementation, the instructions 1122 include instructions for an electronic program guide component 1105 (e.g., electronic program guide component 415 in FIG. 4) and/or a software library containing methods that call the electronic program guide component. While the computer-readable storage medium 1128 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

An apparatus to dynamically display additional metadata for a video in a focus area of an electronic program guide (EPG) is also described. In one implementation, the apparatus includes means for receiving metadata for a plurality of media content items. The metadata comprises a scheduled duration for streaming each of the plurality of media content items. The apparatus includes means for displaying a plurality of cells for the plurality of media content items in an overview area in an electronic program guide (EPG) in a user interface. The plurality of cells comprising a subset of the metadata for a respective media content item.

The apparatus includes means for receiving, via the EPG in the user interface, input of a selection of one of the plurality of media content items and means for moving a cell comprising a limited set of metadata for the selected media content item from the overview area to a focus area in the EPG. The apparatus includes means for, in response to determining that a scheduled duration for streaming the selected media content item does not satisfy a condition pertaining to a maximum time interval of the focus area, adjusting, via a processing device, a timeline of the focus area based on the scheduled duration for streaming the selected media content item. The apparatus includes means for replacing the subset of metadata in the cell in the focus area with expanded metadata for the selected media content item.

The apparatus includes means for adjusting a width of the cell of the selected media content item based on the maximum time interval of the focus area. The apparatus includes means for determining that the selected media content item is currently streaming and playing a sample of the selected media content item in the focus area. The sample is played as an underlay of a display of the expanded metadata of the selected media content item.

The apparatus includes means for displaying an image of a frame of the selected media content item in the focus area as an underlay of a display of the expanded metadata of the selected media content item in the focus area. The apparatus includes means for adjusting widths of remaining cells of the plurality of cells in the overview area based on the adjusted timeline of the focus area. The apparatus includes means for displaying a preview area adjacent to the focus area in the EPG, the preview area comprising a cell representing another media content item that is scheduled to play immediately after the selected media content item, the cell comprising at least a portion of additional metadata of the other media content item.

The apparatus includes means for receiving input of a selection of the cell in the preview area, moving the cell from the preview area to the focus area, in response to a determination that a scheduled duration for streaming the other media content item is less than or equal to than the maximum time interval of the focus area, adjusting the timeline of the focus area based on the scheduled duration for streaming the other media content item, and in response to a determination that the scheduled duration for streaming the other media content item is greater than the maximum time interval of the focus area, adjusting the timeline of the focus area to the maximum time interval. The apparatus includes means for adjusting a width of the cell moved from the preview area to the focus area to match the width of the focus area.

In one implementation, the scheduled durations for the plurality of media content items is based on a playlist of media content items created for a particular user.

What is claimed is:

1. A method, comprising:
receiving, by a processing device, metadata for a plurality of media content items, wherein the metadata identifies a thumbnail representation of each of the plurality of media content items;
displaying the plurality of media content items in an overview area in an electronic program guide (EPG) of a user interface, wherein the overview area comprises a plurality of cells aligned in one or more rows, wherein the plurality of cells comprise a subset of the metadata for a respective media content item, wherein the subset of the metadata comprises the thumbnail representations of the plurality of media content items, and wherein the thumbnail representations are displayed in the overview area;
receiving input of a selection of one of the plurality of media content items displayed at the EPG in the user interface; and
responsive to receiving the input of the selected media content item, displaying the selected media content item in a focus area in the EPG of the user interface, the focus area comprising expanded metadata that includes a sample of the selected media content item that is played as an underlay of a display of at least some of the subset of the metadata of the selected media content item such that playback of the sample is presented underneath the display of the at least some of the subset of the metadata of the selected media content item, and wherein the focus area displays the selected media content item but not other media items of the plurality of media content items.

2. The method of claim 1, further comprising:
playing the sample of the selected media content item in the focus area.

3. The method of claim 1, wherein the focus area is located above the overview area, and wherein no other media content items are displayed above the focus area.

4. The method of claim 1, wherein the focus area is displayed as a rectangular area of the EPG.

5. The method of claim 4, wherein the rectangular area of the focus area extends to at least two edges of a display screen of a computing device.

6. The method of claim 1, wherein the plurality of cells comprise a first plurality of cells and a second plurality of cells, wherein the first plurality of cells align in a first row of the one or more rows of the overview area, and wherein the second plurality of cells align in a second row of the one or more rows of the overview area.

7. The method of claim 1, wherein the plurality of cells of the overview area are scrollable.

8. A system, comprising:
a memory; and
a processing device, coupled to the memory, to perform operations comprising:
receiving metadata for a plurality of media content items, wherein the metadata identifies a thumbnail representation of each of the plurality of media content items;
displaying the plurality of media content items in an overview area in an electronic program guide (EPG) of a user interface, wherein the overview area comprises a plurality of cells aligned in one or more rows, wherein the plurality of cells comprise a subset of the metadata for a respective media content item, wherein the subset of the metadata comprises the thumbnail representations of the plurality of media content items, and wherein the thumbnail representations are displayed in the overview area;
receiving input of a selection of one of the plurality of media content items displayed at the EPG in the user interface; and
responsive to receiving the input of the selected media content item, displaying the selected media content item in a focus area in the EPG of the user interface, the focus area comprising expanded metadata that includes a sample of the selected media content item that is played as an underlay of a display of at least some of the subset of the metadata of the selected media content item such that playback of the sample is presented underneath the display of the at least some of the subset of the metadata of the selected media content item, and wherein the focus area displays the selected media content item but not other media items of the plurality of media content items.

9. The system of claim 8, the operations further comprising:
playing the sample of the selected media content item in the focus area.

10. The system of claim 8, wherein the focus area is located above the overview area, and wherein no other media content items are displayed above the focus area.

11. The system of claim 8, wherein the focus area is displayed as a rectangular area of the EPG.

12. The system of claim 11, wherein the rectangular area of the focus area extends to at least two edges of a display screen of a computing device.

13. The system of claim 8, wherein the plurality of cells comprise a first plurality of cells and a second plurality of cells, wherein the first plurality of cells align in a first row of the one or more rows of the overview area, and wherein the second plurality of cells align in a second row of the one or more rows of the overview area.

14. The system of claim 8, wherein the plurality of cells of the overview area are scrollable.

15. A non-transitory computer-readable medium comprising instructions that, responsive to execution by a processing device, cause the processing device to perform operations comprising:
receiving metadata for a plurality of media content items, wherein the metadata identifies a thumbnail representation of each of the plurality of media content items;
displaying the plurality of media content items in an overview area in an electronic program guide (EPG) of a user interface, wherein the overview area comprises a plurality of cells aligned in one or more rows, wherein the plurality of cells comprise a subset of the metadata for a respective media content item, wherein the subset of the metadata comprises the thumbnail representations of the plurality of media content items, and wherein the thumbnail representations are displayed in the overview area;

receiving input of a selection of one of the plurality of media content items displayed at the EPG in the user interface; and responsive to receiving the input of the selected media content item, displaying the selected media content item in a focus area in the EPG of the user interface, the focus area comprising expanded metadata that includes a sample of the selected media content item that is played as an underlay of a display of at least some of the subset of the metadata of the selected media content item such that playback of the sample is presented underneath the display of the at least some of the subset of the metadata of the selected media content item, and wherein the focus area displays the selected media content item but not other media items of the plurality of media content items.

16. The non-transitory computer-readable medium of claim the operations further comprising:

playing the sample of the selected media content item in the focus area.

17. The non-transitory computer-readable medium of claim wherein the focus area is located above the overview area, and wherein no other media content items are displayed above the focus area.

18. The non-transitory computer-readable medium of claim wherein the focus area is displayed as a rectangular area of the EPG, and wherein the rectangular area of the focus area extends to at least two edges of a display screen of a computing device.

19. The non-transitory computer-readable medium of claim wherein the plurality of cells comprise a first plurality of cells and a second plurality of cells, wherein the first plurality of cells align in a first row of the one or more rows of the overview area, and wherein the second plurality of cells align in a second row of the one or more rows of the overview area.

20. The non-transitory computer-readable medium of claim wherein the plurality of cells of the overview area are scrollable.

* * * * *